United States Patent
Mason et al.

(10) Patent No.: US 8,265,041 B2
(45) Date of Patent: Sep. 11, 2012

(54) WIRELESS COMMUNICATIONS SYSTEMS AND CHANNEL-SWITCHING METHOD

(75) Inventors: Ralph Dickson Mason, Ottawa (CA); Renyuan Li, Ottawa (CA); Jean-Paul Rene Decruyenaere, Ottawa (CA)

(73) Assignee: SMSC Holdings S.a.r.l., Luxemburg (LU)

( * ) Notice: Subject to any disclaimer, the term of this patent is extended or adjusted under 35 U.S.C. 154(b) by 884 days.

(21) Appl. No.: 12/106,098

(22) Filed: Apr. 18, 2008

(65) Prior Publication Data

US 2009/0262709 A1    Oct. 22, 2009

(51) Int. Cl.
*H04J 3/00* (2006.01)
(52) U.S. Cl. .......................................... 370/336
(58) Field of Classification Search .......... 370/230–235, 370/310, 329–335, 395.4, 395.41, 395.42, 370/431–463, 464–473, 503–510
See application file for complete search history.

(56) References Cited

U.S. PATENT DOCUMENTS

| | | | |
|---|---|---|---|
| 5,005,014 A * | 4/1991 | Jasinski | 340/7.25 |
| 6,292,494 B1 | 9/2001 | Baker et al. | |
| 6,795,410 B1 | 9/2004 | Janky et al. | |
| 7,050,395 B1 * | 5/2006 | Chow et al. | 370/231 |
| 2005/0137966 A1 * | 6/2005 | Munguia et al. | 705/38 |
| 2006/0034220 A1 * | 2/2006 | Shinshou | 370/329 |
| 2006/0187855 A1 * | 8/2006 | Booth et al. | 370/254 |
| 2006/0245470 A1 * | 11/2006 | Balachandran et al. | 375/133 |

FOREIGN PATENT DOCUMENTS

| | | |
|---|---|---|
| CA | 2 366 939 A1 | 7/2002 |
| JP | 2005-203898 | 7/2005 |

OTHER PUBLICATIONS

Written opinion of the International Search Authority for PCT/CA2009/000491, dated Jul. 6, 2009.

* cited by examiner

*Primary Examiner* — Kwang B Yao
*Assistant Examiner* — Jung-Jen Liu

(57) ABSTRACT

A wireless communications system and channel-switching method are disclosed herein. A source device and multiple sink devices independently maintain respective counters which track data packet errors. Each device independently switches channels only after its counter reaches a channel-switching threshold. The new channel switched-to is either determined by an indexed ordering of the available channels or by reference to a global clock maintained by each of the devices. Accordingly, all devices quickly arrive at a common channel. The system switches channels only when necessary and resolves quickly to a mutually acceptable channel. Therefore, unnecessary channel switching is minimized and data throughput is optimized.

22 Claims, 14 Drawing Sheets

|  | TSF | 0(Ini) | 1 | 2 | 3 | 4 | 5 | 6 | 7 | 8 |
|---|---|---|---|---|---|---|---|---|---|---|
|  | ReTrans | 0 | 0 | 1 | 1 | 1 | 0 | 0 | 0 | 0 |
|  | Seq | 0 | 1 | 1 | 1 | 1 | 0 | 1 | 0 | 1 |
| SRC | Channel | 0 | 0 | 0 | 0 | 0 | 0 | 0 | 0 | 0 |
|  | CntCsrc | 6-6 | 6-5 | 5-4 | 4-3 | 3-4 | 4-5 | 5-6 | 6 | 6 |
| SRC>SNK0 |  | ✓ | ✗ | ✓ | ✓ | ✓ | ✓ | ✓ | ✓ | ✓ |
| SNK0>SRC |  | ✓ | ✗ | ✓ | ✓ | ✓ | ✓ | ✓ | ✓ | ✓ |
|  | CntCsnk | 6 | 5 | 5 | 4 | 3 | 4 | 5 | 6 | 6 |
|  | Seq | 0 | 0 | 1 | 1 | 1 | 0 | 1 | 0 | 1 |
| SNK0 | Channel | 0 | 0 | 0 | 0 | 0 | 0 | 0 | 0 | 0 |
|  | ACK | 1 | 0 | 1 | 1 | 1 | 1 | 1 | 1 | 1 |
|  |  |  |  |  |  |  |  |  |  |  |
| SRC>SNK1 |  | ✓ | ✓ | ✗ | ✓ | ✓ | ✓ | ✓ | ✓ | ✓ |
| SNK1>SRC |  | ✓ | ✓ | ✗ | ✓ | ✓ | ✓ | ✓ | ✓ | ✓ |
|  | CntCsnk | 6 | 6 | 5 | 4 | 3 | 4 | 5 | 6 | 6 |
|  | Seq | 0 | 1 | 1 | 1 | 1 | 0 | 1 | 0 | 1 |
| SNK1 | Channel | 0 | 0 | 0 | 0 | 0 | 0 | 0 | 0 | 0 |
|  | ACK | 1 | 1 | 0 | 1 | 1 | 1 | 1 | 1 | 1 |
|  |  |  |  |  |  |  |  |  |  |  |
| SRC>SNK2 |  | ✓ | ✓ | ✓ | ✗ | ✓ | ✓ | ✓ | ✓ | ✓ |
| SNK2>SRC |  | ✓ | ✓ | ✓ | ✗ | ✓ | ✓ | ✓ | ✓ | ✓ |
|  | CntCsnk | 6 | 6 | 5 | 4 | 3 | 4 | 5 | 6 | 6 |
|  | Seq | 0 | 1 | 1 | 1 | 1 | 0 | 1 | 0 | 1 |
| SNK2 | Channel | 0 | 0 | 0 | 0 | 0 | 0 | 0 | 0 | 0 |
|  | ACK | 1 | 1 | 1 | 0 | 1 | 1 | 1 | 1 | 1 |

ReTrans = packet retransmitted by source
SRC = source
SNK? = sink no. ?
CntCsrc = source Hop-in-X counter
CntCsnk = sink Hop-in-X counter
SRC>SNK0 = data packet transmission to sink no. ?
SNK?>SRC = ACK transmission from sink no. ? to source

FIG. 8

|  | TSF | 0(Ini) | 1 | 2 | 3 | 4 | 5 | 6 | 7 |
|---|---|---|---|---|---|---|---|---|---|
|  | ReTrans | 0 | 0 | 1 | 1 | 1 | 1 | 1 | 1 |
|  | Seq | 0 | 1 | 1 | 1 | 1 | 1 | 1 | 1 |
| SRC | Channel | 0 | 0 | 0 | 0 | 0 | 0 | 0 | ▓ |
|  | CntCsrc | 6-6 | 6-5 | 5-4 | 4-3 | 3-2 | 2-1 | 1-0 | 2 |
|  |  |  |  |  |  |  |  |  |  |
| SRC>SNK1 |  | ☑ | ☒ | ☒ | ☒ | ☒ | ☒ | ☒ | ☑ |
| SNK1>SRC |  | ☑ | ☒ | ☒ | ☒ | ☒ | ☒ | ☒ | ☑ |
|  | CntCsnk | 6-6 | 6-5 | 5-4 | 5-3 | 3-2 | 2-1 | 1-0 | 2 |
|  | Seq | 0 | 0 | 0 | 0 | 0 | 0 | 0 | 1 |
| SNK1 | Channel | 0 | 0 | 0 | 0 | 0 | 0 | 0 | ▓ |
|  | ACK | 1 | 0 | 0 | 0 | 0 | 0 | 0 | 1 |
|  |  |  |  |  |  |  |  |  |  |
| SRC>SNK2 |  | ☑ | ☒ | ☒ | ☒ | ☒ | ☒ | ☒ | ☑ |
| SNK2>SRC |  | ☑ | ☒ | ☒ | ☒ | ☒ | ☒ | ☒ | ☑ |
|  | CntCsnk | 6-6 | 6-5 | 5-4 | 5-3 | 3-2 | 2-1 | 1-0 | 2 |
|  | Seq | 0 | 0 | 0 | 0 | 0 | 0 | 0 | 1 |
| SNK2 | Channel | 0 | 0 | 0 | 0 | 0 | 0 | 0 | ▓ |
|  | ACK | 1 | 0 | 0 | 0 | 0 | 0 | 0 | 1 |
|  |  |  |  |  |  |  |  |  |  |
| SRC>SNK3 |  | ☑ | ☒ | ☒ | ☒ | ☒ | ☒ | ☒ | ☑ |
| SNK3>SRC |  | ☑ | ☒ | ☒ | ☒ | ☒ | ☒ | ☒ | ☑ |
|  | CntCsnk | 6-6 | 6-5 | 5-4 | 5-3 | 3-2 | 2-1 | 1-0 | 2 |
|  | Seq | 0 | 0 | 0 | 0 | 0 | 0 | 0 | 1 |
| SNK3 | Channel | 0 | 0 | 0 | 0 | 0 | 0 | 0 | 1 |
|  | ACK | 1 | 0 | 0 | 0 | 0 | 0 | 0 | 1 |

ReTrans = packet retransmitted by source
SRC = source
SNK? = sink no. ?
CntCsrc = source Hop-in-X counter
CntCsnk = sink Hop-in-X counter
SRC>SNK0 = data packet transmission to sink no. ?
SNK?>SRC = ACK transmission from sink no. ? to source

FIG. 9

| | TSF | 0(Ini) | 1 | 2 | 3 | 4 | 5 | 6 | 7 | 8 | 9 | 10 | 11 |
|---|---|---|---|---|---|---|---|---|---|---|---|---|---|
| | Seq | 0 | 1 | 1 | 0 | 0 | 0 | 0 | 0 | 0 | 0 | 0 | 1 |
| SRC | Channel | 0 | 0 | 0 | 0 | 0 | 0 | 0 | 0 | 0 | 1 | 1 | 1 |
| | CntCsrc | 6-6 | 6-5 | 5-6 | 6-5 | 5-4 | 4-3 | 3-2 | 2-1 | 1-0 | 2-1 | 1-2 | 2-3 |
| | | | | | | | | | | | | | |
| SRC>SNK1 | | | ☑ | ☑ | ☑ | ☒ | ☒ | ☒ | ☒ | ☒ | ☑ | ☑ | ☑ |
| SNK1>SRC | | | ☑ | ☒ | ☑ | ☒ | ☒ | ☒ | ☒ | ☒ | ☑ | ☑ | ☑ |
| | CntCsnk | 6 | 6 | 5 | 4 | 3 | 2 | 1 | 0 | 2 | 2 | 1 | 2 |
| | Seq | 0 | 1 | 1 | 1 | 1 | 1 | 1 | 1 | 1 | 0 | 0 | 1 |
| SNK1 | Channel | 0 | 0 | 0 | 0 | 0 | 0 | 0 | 0 | 1 | 1 | 1 | 1 |
| | ACK | 1 | 1 | 1 | 0 | 0 | 0 | 0 | 0 | 0 | 1 | 1 | 1 |
| | | | | | | | | | | | | | |
| SRC>SNK2 | | | ☑ | ☑ | ☑ | ☑ | ☒ | ☑ | ☑ | ☑ | ☑ | ☒ | ☑ | ☑ |
| SNK2>SRC | | | ☑ | ☑ | ☑ | ☑ | ☒ | ☑ | ☑ | ☑ | ☑ | ☒ | ☑ | ☑ |
| | CntCsnk | 6 | 6 | 5 | 6 | 5 | 4 | 3 | 2 | 1 | 0 | 1 | 2 |
| | Seq | 0 | 1 | 1 | 0 | 0 | 0 | 0 | 0 | 0 | 0 | 0 | 1 |
| SNK2 | Channel | 0 | 0 | 0 | 0 | 0 | 0 | 0 | 0 | 0 | 0 | 1 | 1 |
| | ACK | 1 | 1 | 1 | 1 | 0 | 1 | 1 | 1 | 1 | 0 | 1 | 1 |
| | | | | | | | | | | | | | |
| SRC>SNK3 | | | ☑ | ☒ | ☑ | ☒ | ☑ | ☑ | ☒ | ☑ | ☑ | ☒ | ☑ | ☑ |
| SNK3>SRC | | | ☑ | ☒ | ☑ | ☒ | ☑ | ☑ | ☒ | ☑ | ☑ | ☒ | ☑ | ☑ |
| | CntCsnk | 6 | 5 | 5 | 4 | 5 | 4 | 3 | 1 | 1 | 0 | 0 | 2 |
| | Seq | 0 | 0 | 1 | 1 | 0 | 0 | 0 | 0 | 0 | 0 | 0 | 1 |
| SNK3 | Channel | 0 | 0 | 0 | 0 | 0 | 0 | 0 | 0 | 0 | 0 | 1 | 1 |
| | ACK | 1 | 0 | 1 | 0 | 1 | 1 | 0 | 1 | 1 | 0 | 0 | 1 |

ReTrans = packet retransmitted by source
SRC = source
SNK? = sink no. ?
CntCsrc = source Hop-in-X counter
CntCsnk = sink Hop-in-X counter
SRC>SNK0 = data packet transmission to sink no. ?
SNK?>SRC = ACK transmission from sink no. ? to source

FIG. 10

WIRELESS COMMUNICATIONS SYSTEMS AND CHANNEL-SWITCHING METHOD

COPYRIGHT NOTICE

A portion of the disclosure of this patent document contains material that is subject to copyright protection. The copyright owner has no objection to the facsimile reproduction by anyone of the patent document or the patent disclosure, as it appears in the United States Patent and Trademark Office patent files or records, but otherwise reserves all copyright rights whatsoever.

CROSS-REFERENCE TO RELATED APPLICATIONS

Not applicable.

BACKGROUND OF THE INVENTION

1. Field of the Invention

The invention relates generally to wireless communications systems and more particularly to channel-switching in wireless communications systems.

2. Description of the Related Art

A typical wireless communications system consists of a source device and at least one sink device. In such a system, the source device typically transmits data to the sink devices via modulated radio frequency ("RF") signals in a predetermined number of frequency channels. During data transmission, any particular frequency channel may be unreliable for any number of reasons: e.g., the source and sinks may move; the environment of the system may fluctuate causing time-varying fading; and other nearby sources of RF energy (e.g. other wireless devices) may cause interference. Interference by other wireless data systems is particularly problematic in the ISM (industrial, scientific and medical) frequency bands given the ever-increasing number of devices sharing these bands. Consequently, the quality of any particular wireless channel in these bands is somewhat unpredictable.

In coping with the above-described problems, known wireless communications systems typically employ conventional frequency hopping or channel-switching methods wherein the system hops to a new channel at predefined time intervals and follows a predefined channel hopping pattern. In such methods, the system hops to a new channel even when the present channel is of good quality. Such continuous hopping causes an unnecessary decrease in data transmission rates and impacts system stability. Furthermore, by following a predefined channel hopping pattern without regard to the quality of any particular channel, the system may return repeatedly to a channel of poor quality further degrading data transmission rates.

Another challenge to any wireless data transmission system and channel-switching method is the fact that, once the quality of the current channel degrades so as to interrupt communication between the source and sinks, reliable communication cannot be guaranteed. Any channel-switching method must therefore provide for the coordinated and reliable resolution of the source and sinks to an un-congested channel as quickly as possible without thereby requiring reliable communication between the source and sinks. In this way, data transmission can continue with minimal interruption.

There is accordingly a need for a wireless data transmission system and channel-switching method wherein the system switches to a new channel only when the quality of the current channel becomes unacceptable and which provides for the switching of the source and all sinks to a common channel of acceptable quality in an efficient, synchronized and reliable manner.

BRIEF SUMMARY OF THE INVENTION

The above-described advantages are provided by a wireless communications system and channel-switching method described hereinafter.

The invention is found in a channel-switching module for cooperation with a processor, a memory and a transceiver of a first device in a wireless communications system to switch the first device from a first communications channel to a second communications channel, both being in a predetermined ordered set of communications channels. The channel-switching module contains instructions for performing the following steps. A value of a first counter of the first device is adjusted to track data packet transmission errors between the first device and a second device in the wireless communications system. The first device is switched to the second communications channel only after the value of the first counter reaches a channel-switching threshold. A value of a second counter of the second device is also adjusted to track the data packet transmission errors between the first device and the second device. The second device switches to the second communications channel only after the second counter of the second device reaches the channel-switching threshold.

The invention is also found in a first device for communicating with a second device in a wireless communications system. The first device has control logic for causing the first device to communicate data packets with the second device in a first communications channel in a predetermined ordered set of communications channels. The control logic also causes the first device to track a first quality measurement of the first communications channel. The control logic further causes the first device to switch from the first communications channel to a second communications channel in the predetermined ordered set of communications channels after the first quality measurement decreases to or below a channel-switching threshold. The second device tracks a second quality measurement of the first communications channel and switches to the second communications channel after the second quality measurement decreases to or below the channel-switching threshold.

The invention is also found in the following channel-switching method in a wireless communications system including a plurality of devices including a source and at least one sink. The devices communicate in a first communications channel in a predetermined ordered set of communications channels. The method includes the following steps. A value of a source counter associated with the source is adjusted to track data packet transmission errors between the source and the or all of the sinks. For the or each sink, a value of a sink counter associated with that sink is adjusted to track the value of the source counter. The source is switched to a second communications channel in the predetermined ordered set of communications channels when the value of the source counter reaches a channel-switching threshold. For the or each sink, that sink is switched to the second communications channel when the value of the sink counter associated with that sink reaches the channel-switching threshold.

BRIEF DESCRIPTION OF THE DRAWINGS

An understanding of the exemplary embodiments will be obtained from the following description, with reference to the following drawings in which:

FIGS. 8-10 show charts illustrating examples of channel-switching behaviour of devices in an exemplary system employing index-based channel-switching;

DETAILED DESCRIPTION OF EXEMPLARY EMBODIMENTS OF THE INVENTION

Figure 1:
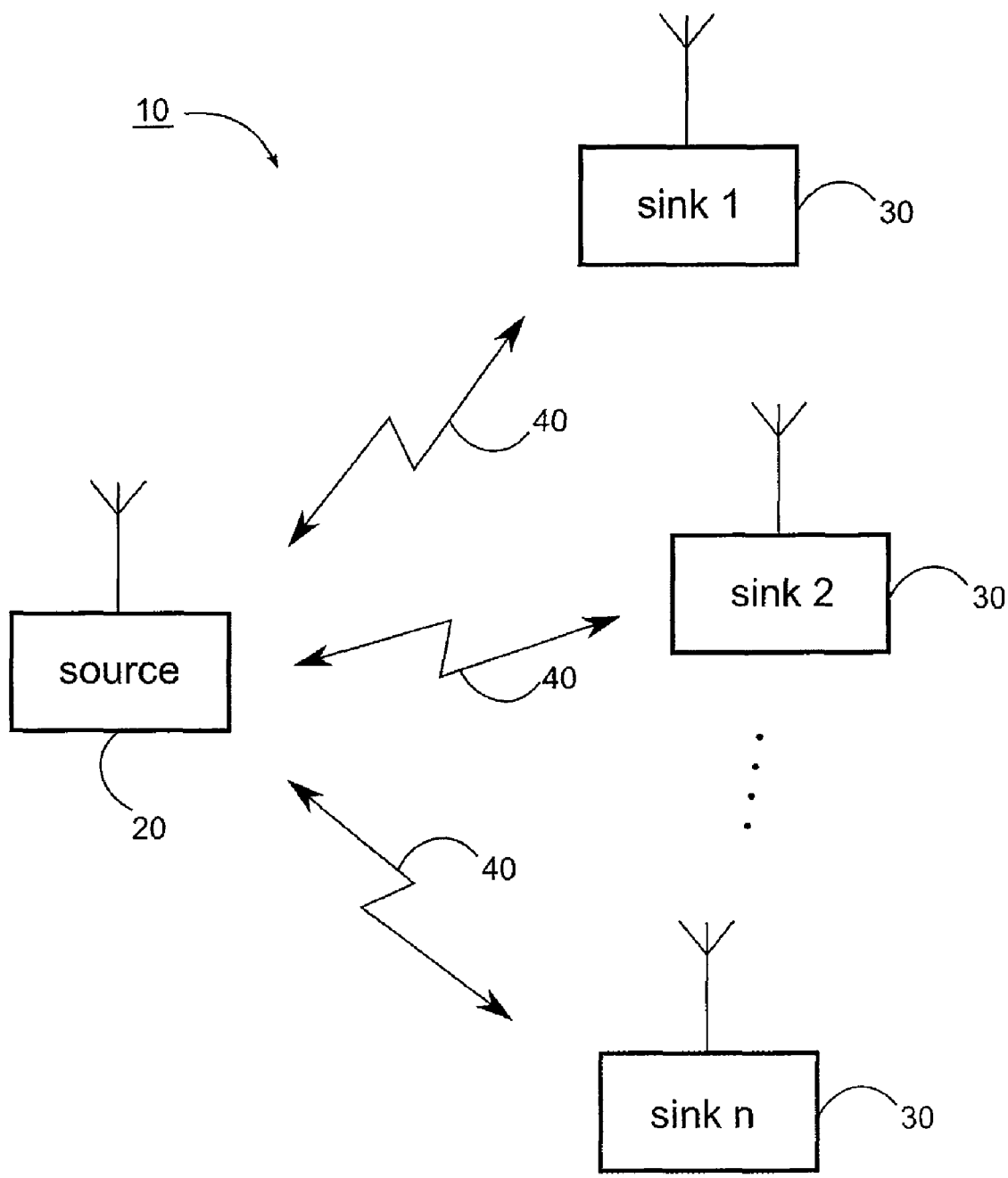
FIG. 1 shows an exemplary wireless communications system.

An exemplary wireless communications system and channel-switching method are described hereinafter with reference to the drawings. Where appropriate, the same reference numerals are used in the drawings to indicate like features in all of the drawings.

System Overview

With reference to FIG. 1, the wireless communications system 10 includes a source device 20 which is the principal source of information to be transmitted for reliable reception by at least one sink device 30. The source and sink devices communicate via wireless signals 40.

Accordingly, the system is particularly useful for the wireless transmission of content from a single source device to a plurality of display or performance devices. For example, the system may be used to transmit audio data from a single source device to a plurality of sound performance devices such as headphones, speakers, or devices in a multi-channel audio/video system. Alternatively, the system may be used to transmit audio/video data from a single source device to a plurality of display devices such as monitors or televisions for performing the content of the data. In general, the system may be used for the reliable transmission from a single source device to at least one sink device of any content which may be reduced to digital information and converted to a wireless communications signal.

The system may be configured to communicate by any means wherein information may be encoded into a wirelessly transmissible signal, propagated from a source device to at least one sink device, and then decoded from the wireless signal. Accordingly, the system may be configured to communicate by means of any energetic disturbance capable of encoding information such as electromagnetic waves including RF waves, infrared waves, laser light or mechanical waves such as sound waves.

While a particular function of the system is the essentially continuous transmission of data from the source to the sinks, in general each of the source and sink devices is configured both to transmit and receive wireless signals. As is described hereinafter, the source also receives signals transmitted by the sinks in carrying out normal communications as well as for carrying out the channel-switching method.

Figure 2B:
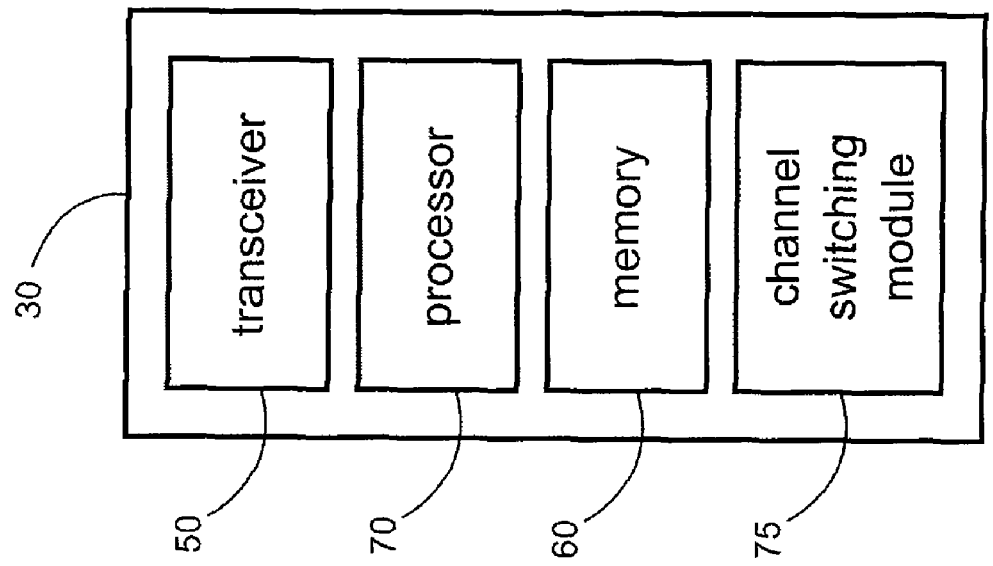
FIGS. 2A & 2B show source and sink devices, respectively, in an exemplary system.
Figure 2A:
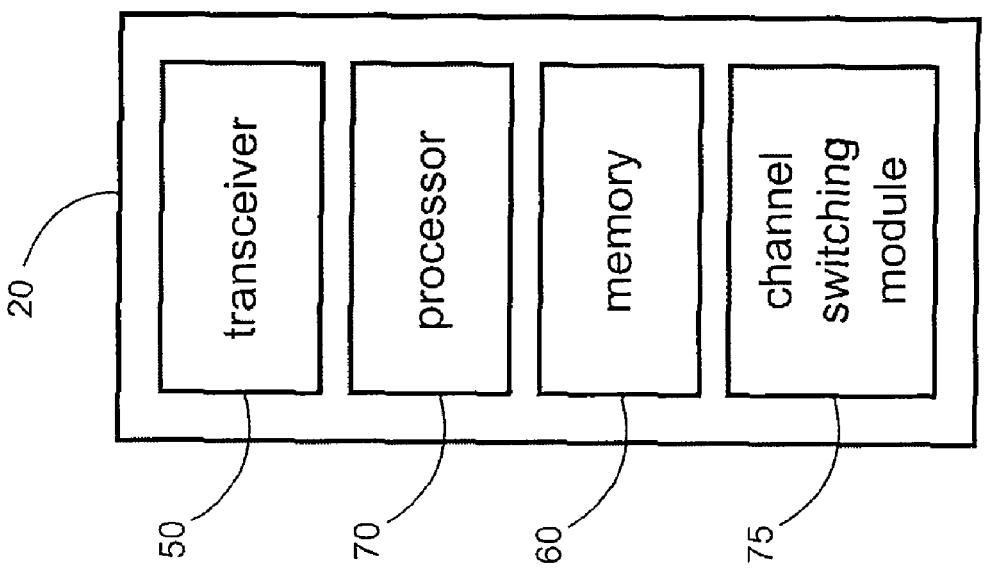

With reference to FIGS. 2A & 2B, each of the source 20 and sink 30 devices has a suitable transceiver 50 for sending and receiving wireless signals as described herein, a memory 60 for storing data contained in the wireless signals, and a processor 70 for carrying-out the various predetermined desirable functions of the devices. Each device has control logic for carrying out ordinary communications (e.g. data mode) and the channel-switching method described hereinafter. The control logic is, in some embodiments, contained, at least in part, in a channel-switching module 75 for cooperating with the transceiver, memory and processor to carry out the channel-switching method described hereinafter. The channel-switching module may comprise a separate physical module, e.g. an electronic component such as an integrated circuit or printed circuit board connected to the processor, memory and transceiver. The instructions for carrying out the channel-switching method in cooperation with the memory and transceiver may be embodied in any suitable form. Alternatively, the channel-switching module may be embodied in the memory as software code for execution by the processor which is connected to the memory and transceiver.

The operation of the source and sink devices in the wireless communications system will now be described.

System Operation Overview

Each of the source and sink devices is configured to communicate in any one of a predetermined ordered set of wireless frequency channels. During normal communications (i.e. not during channel-switching), the source and all of the sinks communicate in a single one of these frequency channels.

When the source and sink devices are first activated they may start in the same channel, but more commonly start in different channels. In order to establish communication links between the source and sink devices an initialization routine is performed which depends upon the particular characteristics of the devices and of the wireless signals employed. Given a particular set of source and sink devices, any suitable initialization routine may be employed to establish a link between the source and sink devices in a first channel in the set of channels. For example, in one such initialization routine the source begins in a first channel and sends out a signal to the sinks. Any sinks that happen to be in that first channel enrol with the source by responding in a handshaking routine. The source then advances to the next channel in the predetermined ordered set of channels and any sinks previously enrolled with the source follow it into the next channel. In this manner, the source scans all of the channels in the set of channels until all sinks have been enrolled with the source.

Figure 3:
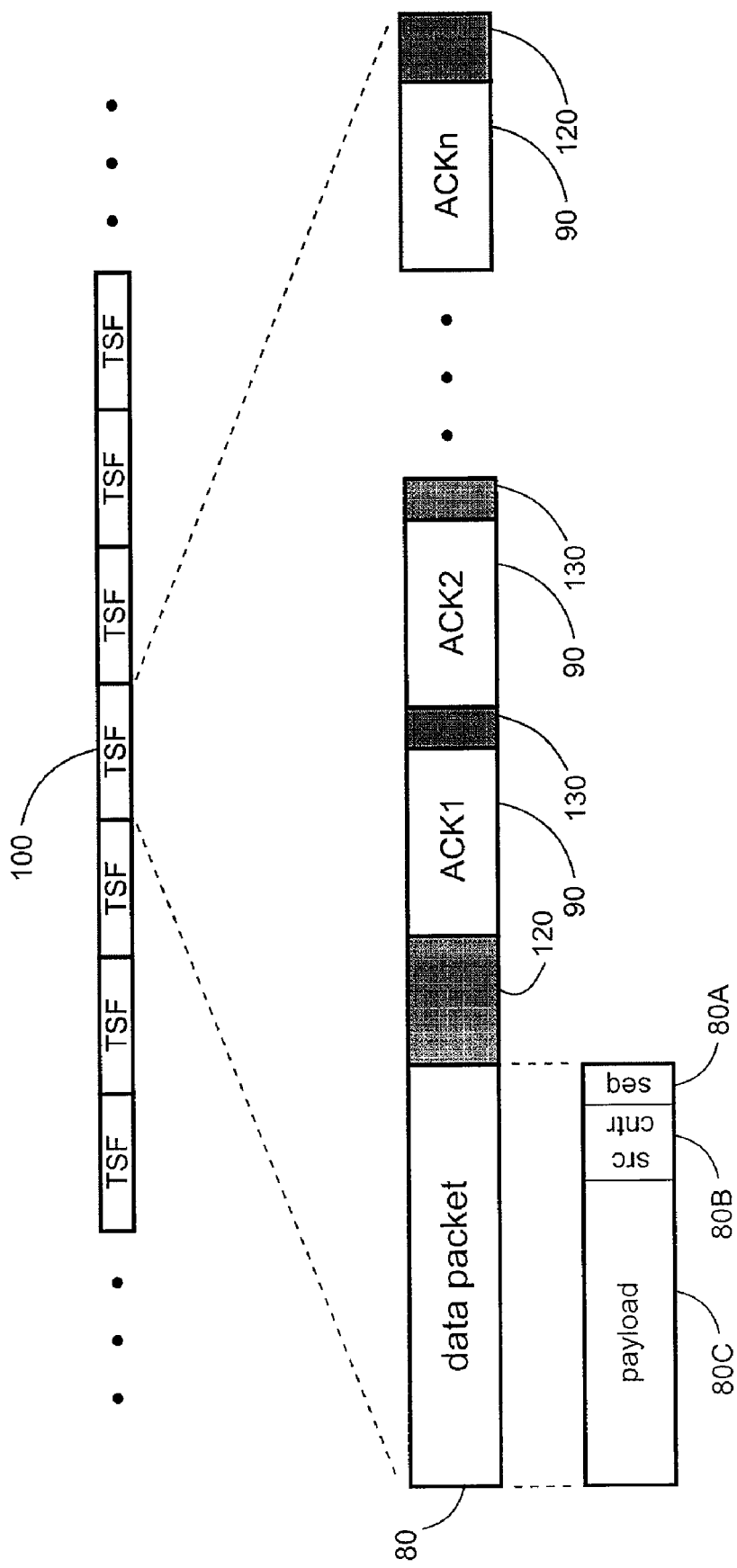
FIG. 3 shows a time super frame ("TSF") employed in an exemplary system.

Once a link is established, the source and sink devices communicate through wireless signals encoding information in the form of data packets. With reference to FIG. 3, the source generally transmits a data packet 80 to the sinks and receives acknowledgement signals 90 (hereinafter called "ACKs") from the sinks in a predetermined time period called a "time super frame" or "TSF" 100. Accordingly, once a wireless link is established, the source and sinks enter a timed mode defined by the TSF and a first data packet is sent by the source and received by each of the sinks. Each sink then transmits an ACK to the source within one TSF. The source and sink devices communicate in this manner in an indefinite series of TSFs until stopped deliberately or channel-switching occurs as described hereinafter.

Each data packet sent by the source to the sinks contains at least: a sequence number 80A indicating whether the packet is a new packet or is a re-transmitted packet; the value of the source's Hop-in-X counter 80B, described hereinafter; and the data payload 80C. These segments may be located in the data packet in any suitable order, and the data packet may also contain any additional useful segments as determined by the system and any additional desirable functionality.

In the TSF 100, once the source transmits a data packet 80 to the sinks, a transceiver turnaround time 120 is provided for the source to switch its transceiver from transmit mode to receive mode to begin receiving ACKs 90, and for the sinks to switch their transceivers from receive mode to transmit mode to begin sending ACKs 90.

Upon receiving the data packet, each sink, in a predetermined order, transmits an ACK 90 to the source acknowledging receipt of the data packet 80. A predetermined guard time 130 is allowed between the transmission of each sink's ACK 90 in order to avoid interference between ACKs 90 in the channel. Once the last ACK 90 is sent, a further transceiver turnaround time 120 is provided for the source and sinks to switch their transceivers back to transmit and receive modes, respectively.

Synchronization of the sinks to the source consequently provides each sink with a TSF having the same start time and end time as the source. The source and sinks thereafter operate continuously in the timed mode using the TSF as an operational period. The source and sinks may thereby coordinate communications by the expectation that data packets will be sent by the source at the beginning of each TSF and ACKs will be returned by each sink at a predetermined position in the TSF.

Figure 4:
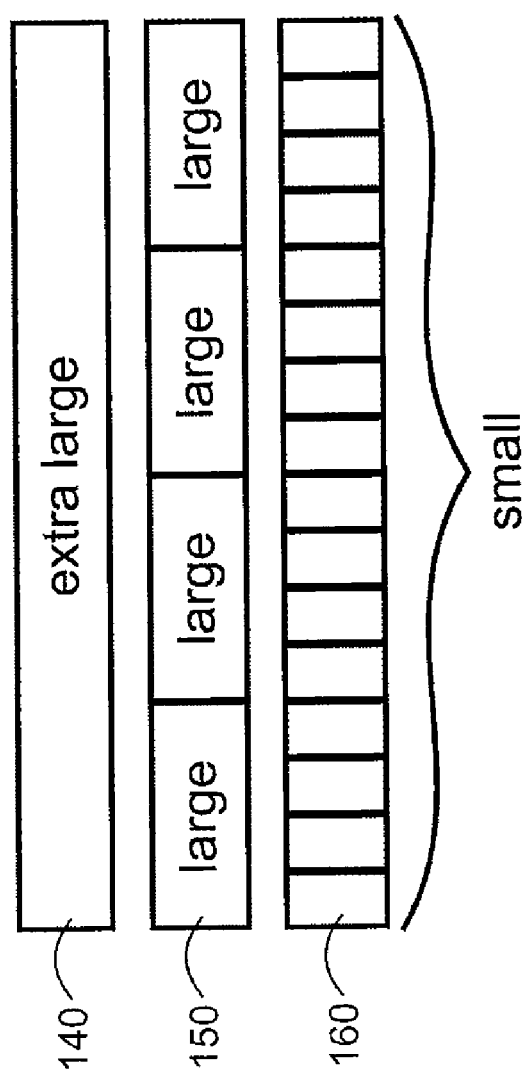
FIG. 4 shows TSFs of various sizes used in an exemplary system.

The TSF may have any suitable length (i.e. duration) for the particular system and communications application. The length of the TSF may further be fixed or may vary according to the wireless channel conditions or the particular functions being performed during channel-switching. FIG. 4 shows three different TSF lengths used in the exemplary system and channel-switching method. These include an extra-large TSF 140, a large TSF 150 and a small TSF 160. The size of each TSF is an integer multiple of the next smaller TSF. Any desired ratios may be selected. In the exemplary system and method, the extra-large TSF 140 is four times the size of the large TSF 150, which is in turn four times the size of the small TSF 160. Whatever size or sizes of TSFs is selected, each of the source and sink devices is preconfigured to operate according to the TSF or TSFs, as the case may be.

As is described further hereinafter, each of the source and sinks maintains a counter for characterizing the quality of the channel and governing entry into channel-switching mode. As with all data packets transmitted by the source, the content of this first data packet includes the current value of the source's counter. As is also described further hereinafter, each sink adjusts its counter in response to the value of the source's counter received in the data packet in order to track the source's counter. The initial value of the source's counter which is contained in the first data packet may be selected on any suitable basis including an estimate of the initial channel quality or by experimentation with the particular implementation of the system.

Data Mode and Channel-Switching Mode

As described above, the system first performs an initialization routine to establish a wireless link between the source and sink devices in a first channel. The source and sink devices are then synchronized and thereafter operate in a timed mode defined by a predetermined TSF. Thereafter, each of the source and sink devices operates at any given time in one of two operational modes: a data mode and a channel-switching mode.

The source and sink devices operate in data mode for streaming (i.e. transmitting) the data of interest (e.g. audio, audio/video, data). The devices remain in data mode so long as they are able to communicate with sufficient reliability and quality in the channel in use. If there is a failure of communication or if the quality of communication (as measured by, e.g., data throughput, packet error rate) falls below a predetermined threshold, the system enters channel-switching mode in order to find a better channel. The data and channel-switching modes are now described in turn.

Data Mode and Hop-in-X Counters

The system operates in data mode for streaming the data of interest from the source device to the sink devices. The methods of operation 170, 180 of the source and sinks devices, respectively, in data mode are illustrated by the flowcharts shown in FIGS. 5 & 6, respectively. As described hereinafter, so long as an acceptable quality of communication is maintained, the source and all of the sinks remain in the current channel.

The system operates in a timed mode in accordance with a predetermined TSF. The TSF may be of a fixed length or may be one of a number of predetermined lengths. Of the three TSF sizes in the exemplary system, described above, the system generally uses the large TSF in data mode. It may also be configured to switch between the large and extra-large TSFs so as to operate using the extra-large TSF when the quality of the current channel is particularly good. For example, the devices may be configured to switch between the extra-large and large TSFs based on a measured packet error rate (described hereinafter): if the packet error rate measured by a device using the large TSF falls below a predetermined threshold, then that device switches to the extra-large TSF; conversely, if the packet error rate rises above a predetermined threshold, then the device switches from the extra-large to the large TSF. Doing so may provide more efficient data transmission and a reduction in power consumption thereby extending battery life in battery-powered source and sink devices. The selection of the size of the large and extra-large TSF may be based on application-specific considerations such as the compressed audio rate in an audio data transmission system and packet error statistics.

Figure 5:
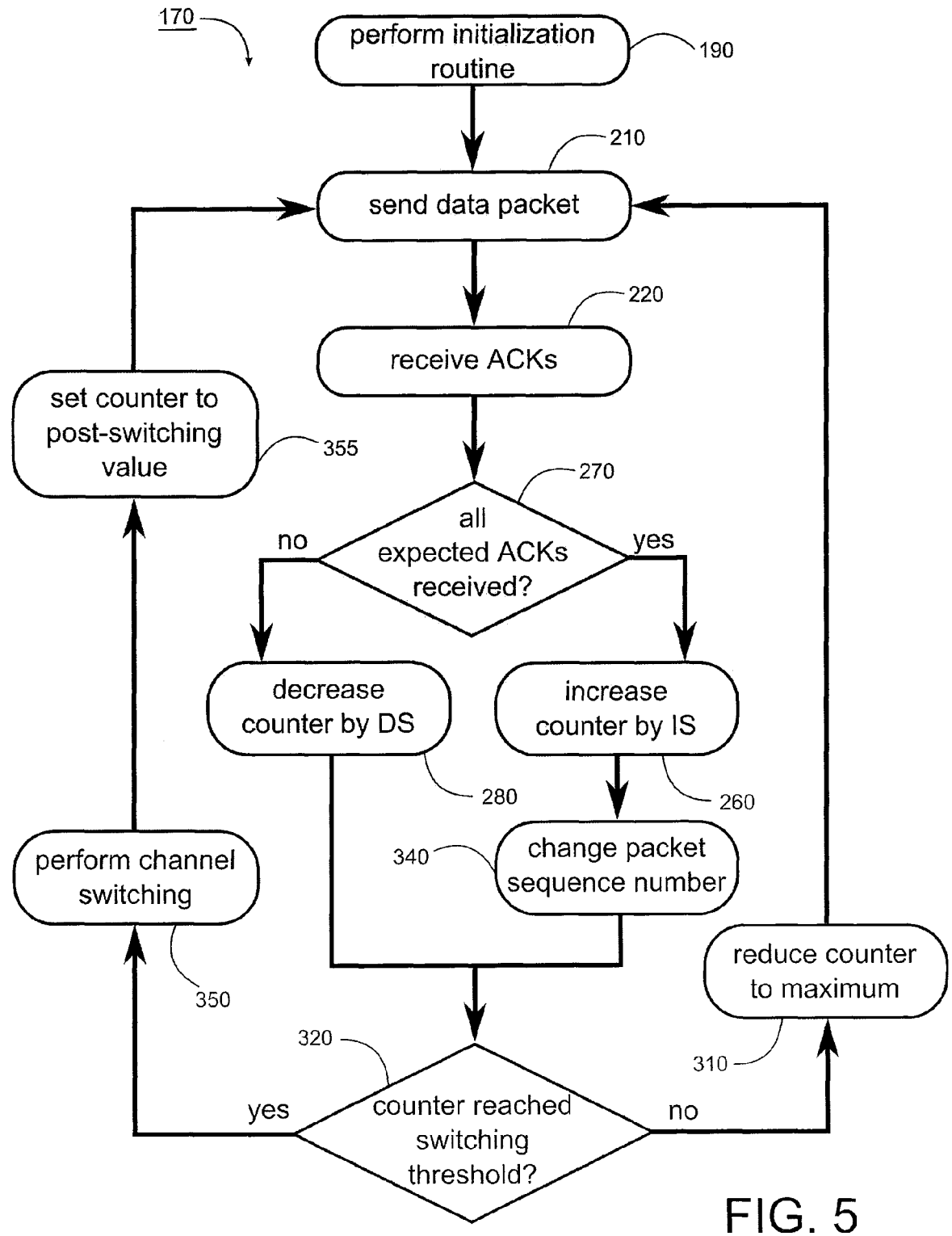
FIGS. 5 & 6 show flowcharts illustrating the operation of a source device and a sink device, respectively, in a data mode of an exemplary system.
Figure 6:
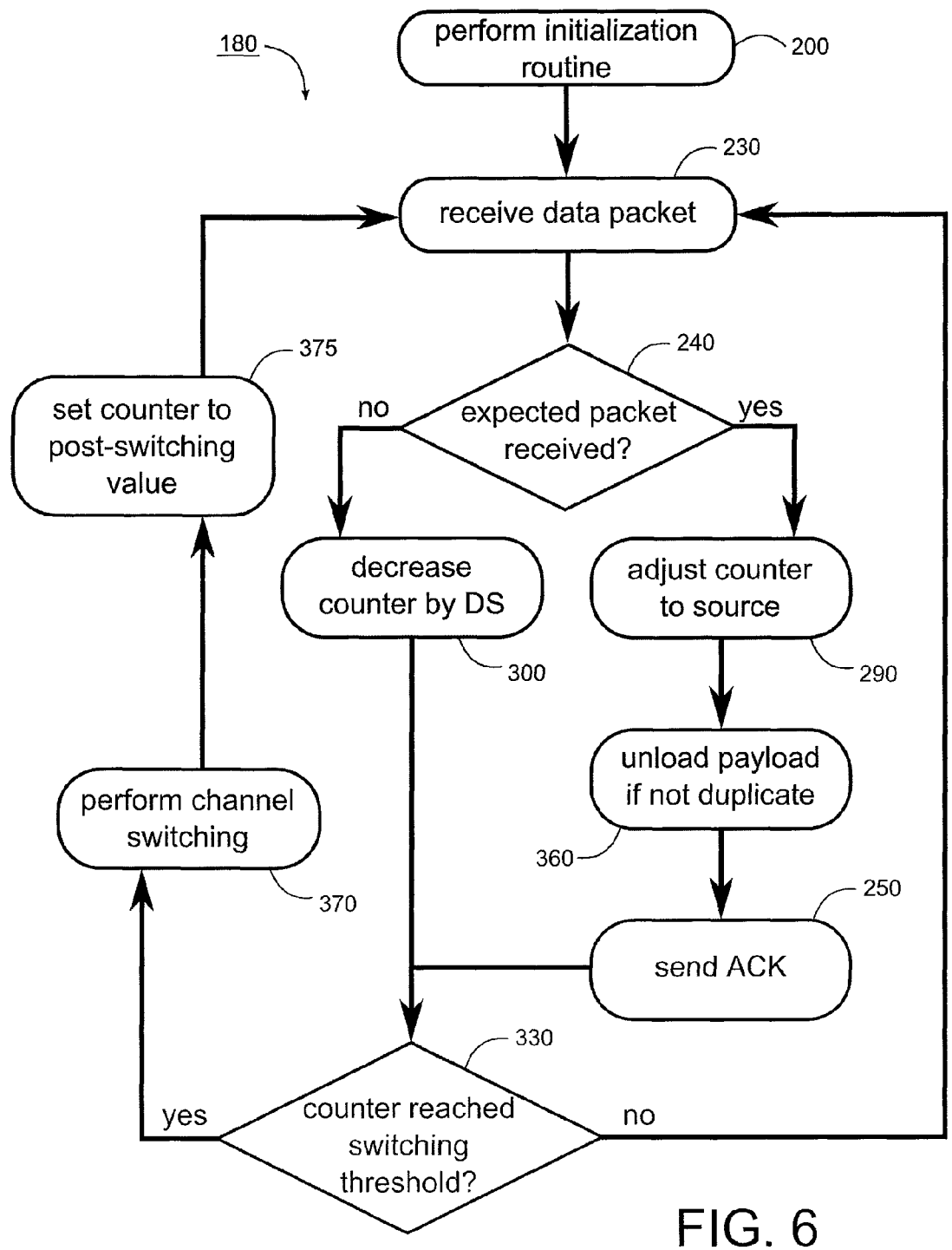

With reference to FIGS. 5 & 6, once the source and sink devices perform the initialization routine (steps 190 & 200) in order to establish communication links therebetween and enter timed mode, the source transmits a data packet to the sinks (step 210) and waits to receive ACKs from the sinks within the TSF (step 220). Similarly, each of the sinks waits to receive the data packet from the source (step 230), and if it does so within the TSF (decision 240) responds with an ACK (step 250).

If the current channel is of poor quality, there is an increased chance that one or more of the sinks will not receive the data packet or that the source will not receive one or more of the ACKs. Such communication, or 'data packet transmission', errors may be tracked to characterize the quality of the particular channel of communication. The channel quality measured in this way may then be used along with predetermined channel quality criteria by each device to decide when to enter channel-switching mode and to switch to a different channel.

Accordingly, the source device maintains a "Hop-in-X" counter counting in a "leaky basket mode". In the source, the counter is increased by an increment step ("IS") (step 260) when all of the ACKs expected from the sinks are in fact received (decision 270). Conversely, the counter is decreased by a decrement step ("DS") (step 280) when any of the expected ACKs from the sinks are not received (decision 270). Accordingly, when the channel quality is good the counter value will increase and when the channel quality is poor the counter value will decrease.

Similarly, each sink likewise maintains a "Hop-in-X" counter intended to track the value of the source's counter. Each data packet sent by the source contains the value of its counter and each sink which successfully receives a data packet from the source (decision 240) adjusts its counter to track the source's counter (step 290). If the sink does not receive the expected packet within the TSF (decision 240), however, it decreases its counter by DS (step 300); this is effective to track the source's counter, as the source will likewise decrease its counter by DS since it will not receive an ACK from this sink (this sink will not send an ACK since it has not received the packet).

Although a sink which successfully receives a data packet thereby has an indication of the value of the source's counter at the beginning of the TSF, the value of the source's counter may change by the end of the TSF without further communication to that sink. For example, while the data packet may be received by a first sink and an ACK successfully returned to the source, a subsequent sink may fail to receive the data packet or the source may fail to receive the responding ACK. In this case, the source's counter will decrease by DS by the end of the TSF, but the first sink will have no indication of this. In any event, the counter of a sink which has received a packet will, at the end of the TSF, either match the source's counter or have a value –IS or +DS of the source's counter. Therefore, the sink's counter will track the source's counter closely.

Each of the source and sink's counters is maintained between two limits: a maximum, and a minimum representing the channel-switching threshold. As is described hereinafter, these limits may be fixed or may be variable. If the counter reaches the maximum value, it is maintained at that value (step 310) (i.e. is reduced to the maximum) and does not increase further even if good communication persists. If the counter reaches the channel-switching threshold (steps 320, 330), that device enters channel-switching mode and switches to a new channel (steps 350, 370) as described hereinafter. Thus, the device switches to a new channel only after the counter reaches the channel-switching threshold. The channel-switching threshold may be selected to be any suitable value given a particular selection of IS & DS, but in the exemplary system and channel-switching method it is selected to equal zero (0).

Accordingly, with reference to FIG. 5, if the source receives all expected ACKs from the sinks (decision 270), it increases its counter by IS (step 260). It is to be appreciated that the source is configured to send the next data packet in the series and change the packet sequence number (step 340) accordingly. If the source does not receive all expected ACKs (decision 270), however, it decreases its counter by DS (step 280) and the same packet will be resent in the next iteration with the same packet sequence number. While the packet sequence number may be any range of values suitable to identify the packet as a new packet or a retransmitted packet, in the exemplary system the packet sequence number is a single bit and has either the value 0 or the value 1.

If the source's counter has not reduced to the channel-switching threshold (decision 320), it reduces the value of the counter to the maximum value if the counter value has exceeded the maximum value (step 310), and proceeds to send the next data packet (step 210). If the counter has reached the channel-switching threshold (decision 320), however, the source enters channel-switching mode and performs channel-switching (step 350) as is further described hereinafter.

Likewise, with reference to FIG. 6, in respect of each sink, if the sink receives the data packet as expected in the TSF (decision 240), it adjusts the value of its counter to track the source's counter (the value of which is contained in the data packet) (step 290) and transmits an ACK to the source (step 250). If the sink has not yet received this particular data packet (discussed further below), it also unloads the payload from the packet (step 360). If the sink does not receive the data packet within the TSF as expected (decision 240), it decreases its counter by DS (step 300) and sends no ACK. If the sink's counter reaches (by reduction) to the channel-switching threshold (decision 330), it enters channel-switching mode and switches channels (step 370) as is described hereinafter.

If there are at least two sinks, it is possible that, in respect of two consecutive attempts to send the data packet to the sinks, one of the sinks will not receive the packet on the first attempt but will on the second, whereas the other sinks receive it on both attempts. In such a case, the second sink will receive the same data packet twice. Accordingly, the sink will also check whether the data packet received has already been previously received, and only if it has not will the sink unload (i.e. keep the content of) the data packet (step 360).

The selection of the values of counter increment and decrement steps—IS and DS—will affect the entry of devices in the system into channel-switching mode and hence the channel-switching behaviour of the system. Specifically, these values can be selected so that the system will switch to a new channel once transmission falls below a predetermined packet error rate ("PER"). The value of each device's Hop-in-X counter may thus be considered to track the current PER of the system. For example, if IS=DS=1, then the following error pattern may be observed indefinitely: [1 0 1 0 1 0 1 0] (wherein '1' indicates a successful packet transmission and '0' indicates an unsuccessful packet transmission). Such a system may therefore be said to support a PER of 50% (i.e. if the PER increases above 50%, channel-switching will eventually occur). If the value of IS is selected to be less than DS, a lower PER is supported. Table 1 illustrates the PERs supported for various values of IS when DS is selected to be 1.

TABLE 1

Selection of DS, IS and resultant supported PER.

| PER | IS = 1 | IS = ½ | IS = ⅓ | IS = ¼ |
| --- | --- | --- | --- | --- |
| DS = 1 | PER < 50% | PER < 33% | PER < 25% | PER < 20% |

Accordingly, a limited number of counters in the source and sinks are employed to characterize or track quality measurements of the current channel, and, as is described hereinafter, the source and all sinks enter channel-switching mode and switch to a new channel in a synchronized, but independent, manner when the current channel quality has become unacceptable (e.g. reached a channel-switching threshold).

Channel-Switching Mode

Once the source or one of the sink's counters decreases to the channel-switching threshold, it enters channel-switching mode in order to switch to a new channel of hopefully better quality.

As described above, the system communicates in one of a predetermined limited set of channels. In the channel-switching method, each of the source and sink devices is preconfigured to switch channels according to a predetermined sequence or pattern of the channels. In the sequence, the channels are arranged in order to avoid correlation between the current channel and the new channel. When the two channels are uncorrelated, there is a greater probability that the new channel will be better than the old (i.e. the causes of diminished quality in the old channel are not also present in the new channel). Accordingly, the channel-switching sequence is a mapping of the predetermined set of channels.

The channel-switching method and sequence can be index-based or clock-based, each of which is now described in turn.

Index-Based Channel-Switching

Figure 7:
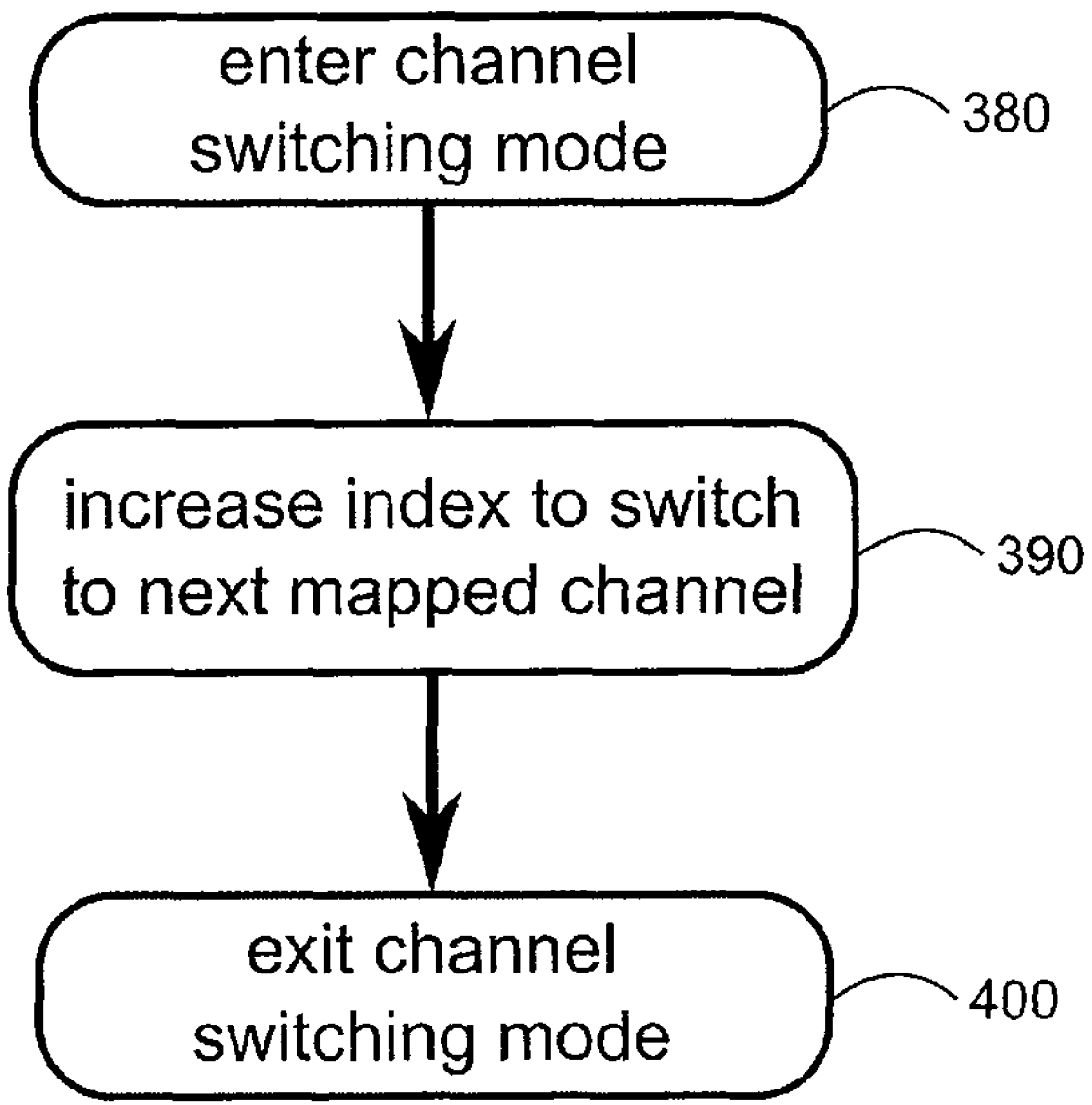
FIG. 7 shows a flowchart illustrating the operation of source and sink devices in a channel-switching mode of an exemplary system employing index-based channel-switching.

With reference to FIG. 7, whenever the source or one of the sinks enters channel-switching mode (step 380) employing index-based channel-switching, the device switches to a new channel (step 390) and exits channel-switching mode to re-enter data mode on the next TSF (step 400). The new channel is the next channel in a predetermined sequence of the predetermined set of channels wherein each of the channels is randomly mapped to an index. Thus, each index position is uniquely mapped to a corresponding one of the channels. Each time the channel is switched, the new channel is simply the channel corresponding to the next index position regardless of the amount of time (i.e. number of TSFs) which has passed between channel switch events. An exemplary channel-switching sequence according to this methodology for a set of 8 channels is illustrated in Table 2.

TABLE 2

Index-based channel-switching example.

| | switch event | | | | | | | | | | | | |
|---|---|---|---|---|---|---|---|---|---|---|---|---|---|
| | 0 | 1 | 2 | 3 | 4 | 5 | 6 | 7 | 8 | 9 | 10 | 11 | ... |
| index | 0 | 1 | 2 | 3 | 4 | 5 | 6 | 7 | 0 | 1 | 2 | 3 | ... |
| mapped channel | 4 | 7 | 3 | 1 | 5 | 2 | 0 | 6 | 4 | 7 | 3 | 1 | ... |
| new channel | 4 | 7 | 3 | 1 | 5 | 2 | 0 | 6 | 4 | 7 | 3 | 1 | |

In the example, the device is initially at index 0 which is mapped to channel 4: i.e., the device is initially communicating in the fourth channel. When the device switches to the next channel (step 390), it simply increases the index by 1 and switches to the channel mapped to that index, i.e. 7. In general, the period of time between channel switches in the system and method is not fixed—it can take any number of TSFs between any two switches. In index-based switching, however, the next channel switched-to is always the next channel in the index regardless of the length of time (i.e. number of TSFs) between switches.

Since the quality of the wireless link between the source and sinks is unpredictable, the packet error pattern between the source and sinks is likewise unpredictable. Consequently, in the channel-switching method described thus far, the source and each of the sinks may switch to a new channel in the same TSF or in different TSFs. However, if the increment step IS is selected to be less than or equal to the decrement step DS, in the worst case the switching time spread between the source and any of the sinks will be no more than one TSF. Accordingly, the source will always switch to a new channel in the same TSF as, or at most one TSF earlier or later than, any of the sinks. Furthermore, the values of IS and DS may be selected so that the switching time spread between each of the sinks will never be more than two TSFs.

Furthermore, it is observed that the index-based channel-switching method in this exemplary system most quickly resolves to a mutually acceptable channel when each sink's counter is set to equal the source's counter when the sink successfully receives a data packet containing the value of the source's counter.

When the source or sinks switch to a new channel, there is no guarantee that the new channel will be of acceptable quality. In order to maximize the overall data throughput over the wireless link, it is desirable to minimize the time taken in channel-switching to find a mutually acceptable channel. As described above, the channel-switching time spread between the source and any of the sinks is at most one TSF. Accordingly, so long as the source and each of the sinks stays in a new channel for at least two TSFs, the source and all of the sinks will be in the same channel at the same time and have a chance to communicate.

Thus, with reference to FIGS. 5 & 6, after a source or sink switches to a new channel and re-enters data mode its counter is set to a predetermined post-switching value HiX_S (steps 355, 375, respectively) which is generally less than the initial value assigned to the counter HiX_L. In order that a device remains in a new channel for at least two TSFs where the value of DS=1, the counter is assigned a value of HiX_S=2. Accordingly, if successful communication does not occur within two TSFs (i.e. the value is decreased by DS=1 twice, and the channel-switching threshold equals 0), then the device will switch to the next channel in the sequence. If successful communication occurs, the value of the counters will increase incrementally by IS as described hereinabove. In this way, the time spent in channels of poor quality is minimized and the source and all of the sinks quickly switch to a channel of acceptable quality.

As discussed above, the initial value of the source's counter, the value of the counters upon exiting channel switching mode, or the maximum value of the counters generally may be selected on any suitable basis including estimates of channel quality or by experimental testing of the particular implementation of the system, and in accordance with the channel-switching method described herein.

These values can also be determined having regard to latency requirements of the particular application of the system including any latency data buffers present in the sinks. For example, a system in which audio data is transmitted from the source to the sinks would generally have a lesser latency requirement than a system in which both audio and video data were transmitted.

With HiX_L=6, HiX_S=2, IS=DS=1, and the channel-switching threshold=0° the index-based channel-switching behaviour of the system in three cases is illustrated in the tables shown in FIGS. 8-10. FIG. 8 shows a case where a few communication errors are experience but the devices recover and remain in the same channel. FIG. 9 shows a case where the source and sinks switch channels in the same TSF. FIG. 10 shows a case where one sink switches one TSF ahead of the source and two sinks switch one TSF after the source. In each chart, the symbol ☑ represents the successful transmission of a packet from the source to a sink or of an ACK from a sink to the source, as indicated in the chart; conversely, the symbol ☒ indicates a failure of such transmission.

The operation of the source and sink devices in this exemplary system and method is further illustrated in the pseudo-code provided in Appendix A hereto. It is to be understood that the pseudo-code is not herein provided to limit the scope of the invention which is determined solely by the claims, but is provided to illustrate one exemplary embodiment of the system and channel-switching method.

The channel-switching method employed in channel-switching mode may be index-based, as described above, or clock-based, a description of which follows.

Clock-Based Channel-Switching

As described above, the source and sinks begin unsynchronized and perform an initialization routine to establish links therebetween in a first channel in the set of channels. The source begins in a timed mode and successively enrolls each of the sinks wherein an initial data packet is sent by the source and received by the sink. When the system employs clock-based channel-switching, each of the devices maintains a clock which recursively measures time in a predetermined fixed measurement (e.g. the small TSF, described above) and counts by a predetermined time resolution (e.g. the small TSF). The channel-switching sequence is mapped to the time of the global clock so that, during channel-switching, a device first determines the global clock time (i.e. value) and selects the channel indexed to that time. Thus, each clock count is mapped to a respective one of the channels in the set of channels. An exemplary channel-switching sequence according to this methodology for 8 channels is illustrated in Table 3.

TABLE 3

Clock-based channel-switching example.

| | | | switch | | | | | | | | | | | | | | | | | | | | |
|---|---|---|---|---|---|---|---|---|---|---|---|---|---|---|---|---|---|---|---|---|---|---|---|
| | 0 | | | | | 1 | | 2 | | | | | | | 3 | | | | | | | | ... |
| clock | T0 | T1 | T2 | T3 | T4 | T5 | T6 | T7 | T8 | T9 | T10 | T11 | T12 | T13 | T14 | T15 | T0 | T1 | T2 | T3 | T4 | T5 | T6 | T7 | ... |
| mapped channel | 4 | 4 | 7 | 7 | 3 | 3 | 1 | 1 | 5 | 5 | 2 | 2 | 0 | 0 | 6 | 6 | 4 | 4 | 7 | 7 | 3 | 3 | 1 | 1 | ... |
| New channel | | | 4 | | | | 1 | | 5 | | | | | | | | 2 | | | | | | | | ... | a predetermined periodicity (e.g. 16 small TSFs). The initial packet sent by the source to each sink contains the value of the source's clock enabling each sink to synchronize its clock to the source's clock. The synchronized clocks of all devices in the system constitute a "global clock" which is thereafter used in clock-based channel-switching, described further hereinafter.

A system employing clock-based channel-switching may use a single size of TSF or multiple sizes of TSFs depending upon the particular function being carried out and the conditions of the operation. In the exemplary system described hereinafter, at least the large and small TSFs are used. Employing small TSFs during channel-switching allows the system and method to search for an acceptable channel more quickly thereby reducing latency in data transmission. Ideally, the small TSF is as small as possible so as to minimize channel-switching time and data transmission latency, but is usually limited by the particular device in the system carrying out the method. The large TSF is ordinarily used in data mode and, as discussed above, the system can also employ the extra-large TSF when channel quality is considered to be very good. When the source or any of the sinks enters channel-switching mode, it employs the small TSF. Once the device completes channel-switching, it re-enters data mode and resumes use of the large TSF.

In contrast to the index-based channel-switching method, described above it is observed that a system employing the clock-based channel-switching method most quickly resolves to an acceptable new channel when each sink's counter is set to the value of the source's counter minus the decrement step DS when a data packet is successfully received.

As described hereinabove, once the Hop-in-X counter of the source or one of the sinks reaches a minimum threshold (e.g. 0), the device enters channel-switching mode and switches to small TSFs. It then switches channels according to the clock-based channel-switching method described hereinafter. The operation of the source and sinks in channel-switching mode employing clock-based channel-switching is illustrated by the finite state machines 410, 420, respectively, shown in FIGS. 11 & 12 respectively, and is described hereinafter.

In clock-based channel-switching, each of the source and sinks has a synchronized clock (the "global clock") which In the example, there are 8 channels in the set with 2 consecutive clock counts (i.e. times) mapped to each channel (i.e. 16 clock counts mapped to 8 channels). The clock repeats every 16 counts. When a device changes a channel in this case it first determines the present clock time and then the corresponding mapped channel. As in the index-based switching example, any number of TSFs can pass between channel-switching events. However, in the case of clock-based channel-switching, the new channel depends on the clock time at the time of the switch and it is not necessarily the next channel in the predetermined map sequence.

After each channel switch in channel-switching mode, the source and sinks attempt communication and if the channel is considered to be good (e.g. a round-trip exchange between the source and all of the sinks is successful), each device exits channel-switching mode, re-enters data mode, and resumes ordinary data communication as described hereinabove. However, if the channel is not considered to be good, the devices switch channels again until the first good channel is found. In clock-based channel-switching, the channel selection is governed by the global clock.

Upon entering channel-switching mode the source and sinks perform a handshaking routine in order to restore communication in a new channel. Since, as described above, each consecutive pair of clock counts is mapped to a single channel each device will wait until the clock time is even before commencing the handshaking routine.

Thus, once the source enters channel-switching mode (state 430), if the clock count is odd, the source's first step is to change channels as determined by the global clock as described above (transition 440) and wait one clock count (state 450). The source then changes channels again as determined by the global clock and sends a "start sync" ("SS") packet to the sinks (transition 460) to begin the handshaking routine. If the clock count is even when the source enters channel switch mode, the source changes channels as determined by the global clock and sends a "start sync" ("SS") packet to the sinks (transition 470) to begin the handshaking routine without waiting.

Likewise, once a sink enters channel-switching mode (state 480), if the clock count is odd, the sink changes channels in accordance with the global clock (transition 490), waits one clock count (state 500), and changes channels again (transition 510) before commencing the handshaking routine.

If the clock count is even, the sink changes channels once (transition 520) without waiting.

Figure 11:
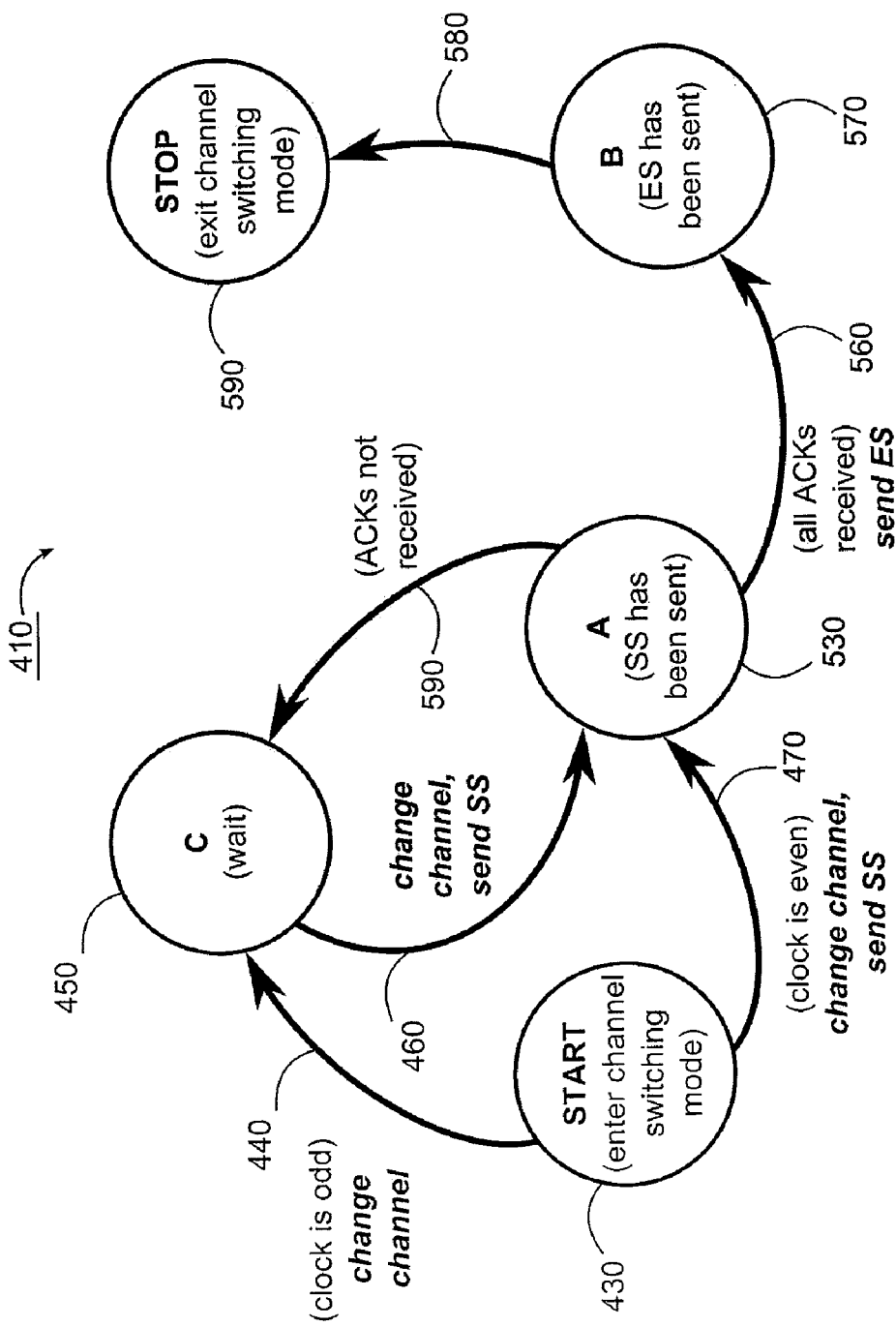
FIGS. 11 & 12 show finite state machine diagrams illustrating the operation of a source device and a sink device, respectively, in a channel-switching mode of an exemplary system employing clock-based channel-switching.
Figure 12:
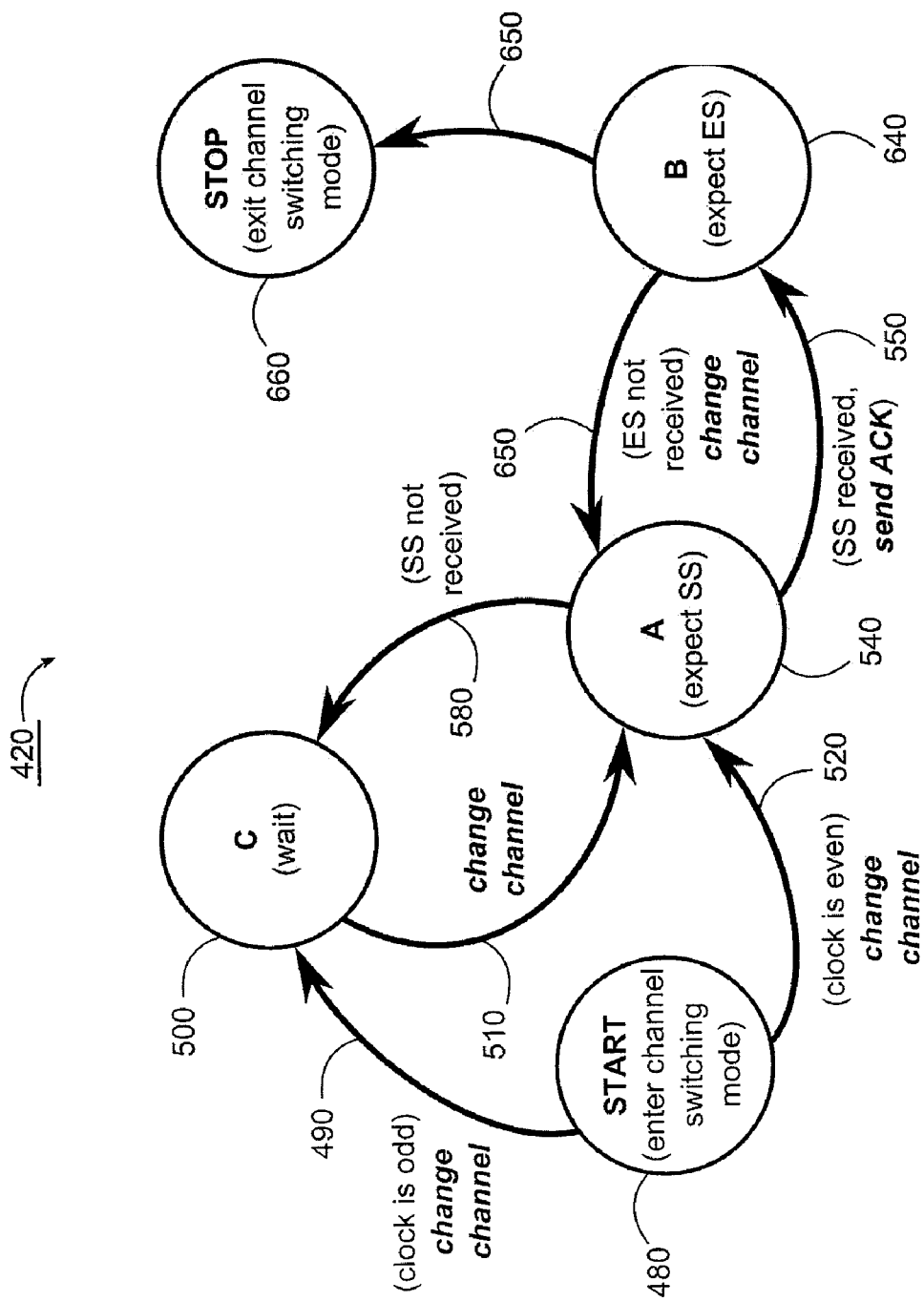

In the handshaking protocol illustrated in FIGS. 11 & 12, the following exchange is attempted. The source sends a start sync ("SS") packet to all of the sinks (transition 460, or 470 if in the initial case, to state 530). All sinks expect to receive the SS packet in the TSF (state 540), and those which receive the SS packet respond with an ACK (transition 550). If the source receives an ACK from all sinks, the source considers the channel to be good and commits to exiting channel-switching mode at the next opportunity, as described hereinafter; the source sends an end sync ("ES") packet to all of the sinks (transition 560 to state 570) signaling to the sinks to exit channel-switching mode at the next opportunity. In this exemplary embodiment, a small TSF is used for channel-switching while a large TSF is used in data mode. After sending an ES packet (state 570), the source exits channel-switching mode (transition 580 to state 590).

The sinks do not send an ACK in response to the ES packet as the source will exit channel-switching mode regardless of whether all of the sinks have received the ES packet. If the sink does not receive the expected SS packet (transition 580), or if the source does not receive all of the expected ACKs (transition 590), then that device waits (states 500, 450 respectively) and tries again. If a sink receives an SS packet it subsequently expects to receive the ES packet (state 640) in this or the next TSF, as described further hereinafter. If it does not, it recommences the handshaking routine (transition 650) as described above. If it receives the ES packet, it proceeds to exit channel-switching mode at the next opportunity (transition 650 to state 660).

Figure 13A:
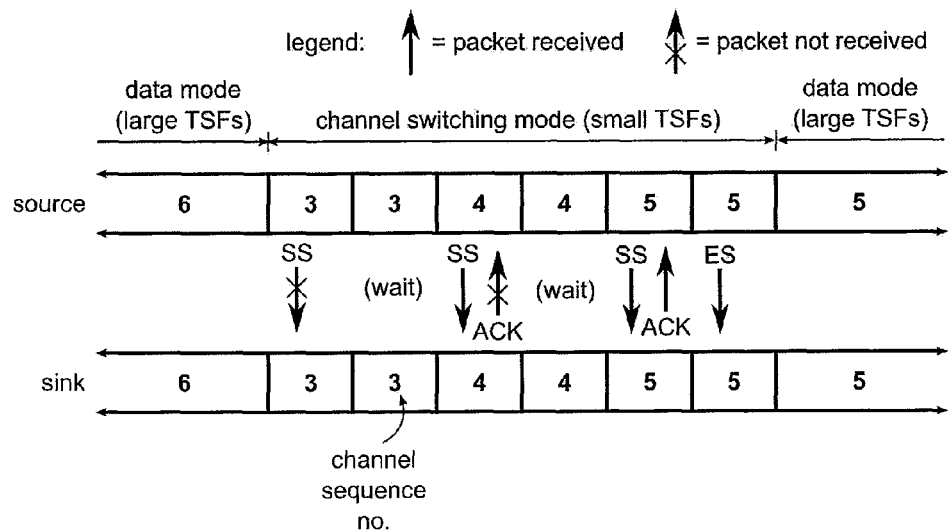
FIGS. 13A, 13B, 14 & 15 show schematic diagrams illustrating examples of the operation of a source device and sink devices in a channel-switching mode of an exemplary system employing clock-based channel-switching.
Figure 13B:
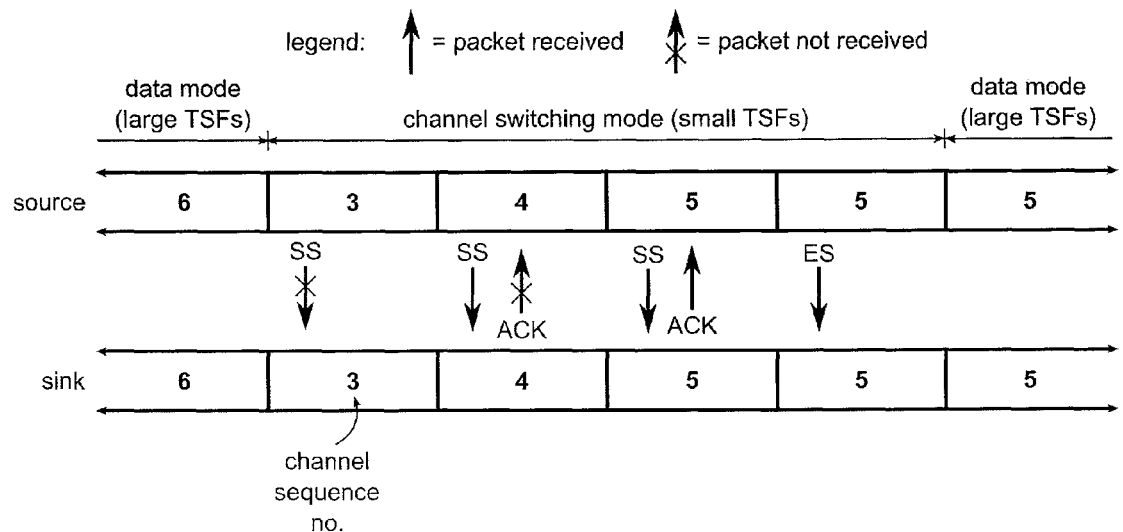
Figure 14:
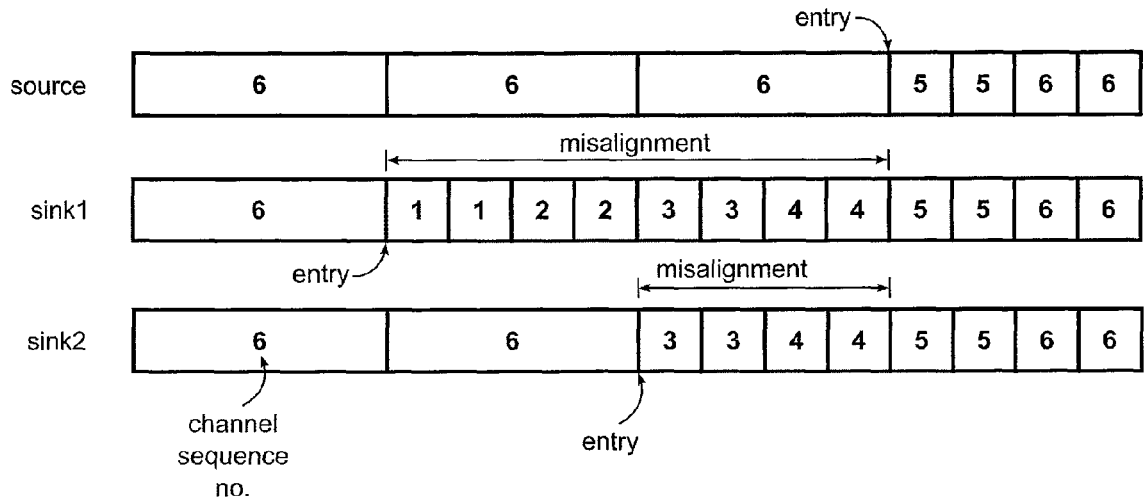

The transition in and out of channel-switching mode and the handshaking exchange are further illustrated in FIGS. 13A, 13B, 14 & 15. As shown in FIGS. 13A & 13B, the handshaking exchange can be performed in two small TSFs, as shown in FIG. 13A, or in a single small TSF, as shown in FIG. 13B.

Once the source or any of the sinks enters channel-switching mode, the device remains in channel-switching mode until the source determines that the channel is good. A channel is considered to be good if a round-trip exchange between the source and all of the sinks is successful. The source and any of the sinks which have received the end sync (ES) packet then exit channel-switching mode and re-enter data mode at the next large TSF boundary.

Since data packet errors are inherently unpredictable, there always remains a chance that the source and the sinks will enter channel-switching mode in different TSFs. However, as described above and as illustrated in FIG. 14, the clock-based channel-switching method provides that all devices which are in channel-switching mode at any given time will be in the same channel.

Figure 15:
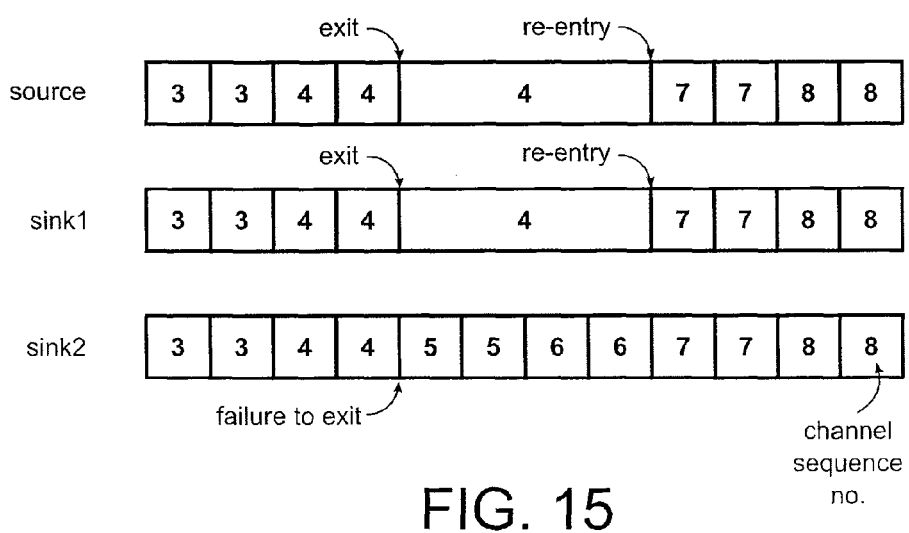

In the event that the source exits channel-switching mode, but one of the sinks does not receive the ES packet as a result of a packet error, the sink will not exit channel-switching mode. However, as illustrated in FIG. 15, the source and sinks which have exited channel-switching mode will soon re-enter channel-switching mode and all devices will again switch channels according to the clock-based channel-switching method until a good channel is found. Eventual recovery from such an exit failure is assured so long as there remains at least one channel which will support an error-free handshaking exchange as described above.

Upon exiting channel-switching mode, the Hop-in-X counter of the source and the sinks is set to a small value in order to minimize the impact of a failed exit. As described in connection with the index-based channel-switching method, such value depends upon the values of IS and DS. When IS=DS=1, the smallest value supported by the method is 2 whereby the device will re-enter channel-switching mode if it experiences two successive communication failures following the previous channel switch. The value also indicates a diminished confidence in the new channel whereas it is untested.

The operation of the source and sink devices in this exemplary system and method is further illustrated in the pseudo-code provided in Appendix B hereto. It is to be understood that the pseudo-code is not herein provided to limit the scope of the invention which is determined solely by the claims, but is provided to illustrate one exemplary embodiment of the system and channel-switching method.

Although various exemplary embodiments of the invention have been disclosed, it should be apparent to those skilled in the art that various changes and modifications can be made which will achieve some of the advantages of the invention without departing from the true scope of the invention.

Embodiments of the invention may be implemented in any conventional computer programming language. For example, preferred embodiments may be implemented in a procedural programming language (e.g. "C") or an object oriented language (e.g. "C++"). Alternative embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

It is to be appreciated that the section headings appearing hereinbefore do not limit the scope of the invention as described but are merely intended the organize the description for the sake of clarity.

With the foregoing exemplary embodiments having been disclosed, it will be apparent to those skilled in the art that various changes and modifications can be made to appropriately suit the needs and objectives of another application and still achieve the advantages of the invention; all such changes and modifications are intended to fall within the scope of the invention as defined by the claims that follow.

APPENDIX A – INDEX-BASED CHANNEL-SWITCHING PSEUDO CODE

*Source Operation Pseudo Code*

An exemplary source operation pseudo-code for the index-based Hop-in-X channel-switching method is provided hereinafter.

The Hop-in-X counters have two different initial levels: i.e. the Hop-in-X long (HiX_L) and the Hop-in-X short (HiX_S). To maintain synchronization between the source and the sinks, the counter value HiX_S is preferably >= 2. The HiX_S counter size determines the rate of the channel-switching method as it represents the minimum number of TSFs the system will remain in a new channel. Accordingly, it is desirable to minimize the value of HiX_S while maintaining the operability of the system.

In the present exemplary embodiment represented by the pseudo-code, a device (i.e. source or sink) will remain in a poor channel for at most 2 TSFs. The latency requirement of the operation is thereby optimized.

The method as illustrated in the following pseudo-code sets the source's switch counter (CntCsrc) to begin at the maximum value HiX_L. The source's switch counter (CntCsrc) is set to HiX_S = 2 whenever the source switches to a new channel.

```
ACKn = packet from the n'th SNK in response to SRC sent packet received.
Constants:
HiX_L = Predefined max hop in X long counts, (e.g HiX_L = 9)
HiX_S = Predefined hop in X short counts, (HiX_S = 2)
IS = 1 (Increment step = 1)
DS = 1 (Decrement step = 1)
Variables:
CntCsrc = Hop in X counter in SRC
Seq= sequence number.
```

```
Pseudo Code:
//Initialization
Setup a connection;
      Seq=0;
      ChannelNo=0;
      CntCsrc =HiX_L;
While(1)
{
      Send packet with CntCsrc count to SNKs
      Receive ACKs from SNK1 to SNKn
      If ACK1=ACK2=…=ACKn=1
            ACK=1
      Else
            ACK=0;
      If ACK then
            CntCsrc = CntCsrc + IS
            Seq=!Seq;
      Else
            CntCsrc = CntCsrc -DS
      If CntCsrc <= 0
            Channel No=ChannelNo+1
            CntCsrc =HiX_S
      ElseIf CntCsrc > HiX_L
            CntCsrc = HiX_L
}
```

Sink Operation Pseudo Code

```
SeqSRC= incoming sequence number from SRC
Packet = if packet from source is received in current TSF
Constants:
HiX_L = Predefined max hop in X long counts, (e.g HiX_L = 9)
HiX_S = Predefined hop in X short counts, (HiX_S = 2)
DS = 1 (Decrement step = 1)
Variables:
CntCsnk = current hop in X count
Last_seq = last seen sequence number.
```

```
//Initialization
        Setup a connection;
    Last_Seq = 1; ChannelNo=0;
    CntCsnk = HiX_L;
While(1)
{
    Receiving packet
    If Packet
        CntCsnk = CntCsrc
        If Last_seq ~= SeqSRC
            Unload packet,
            Last_seq = SeqSRC
        Send ACK with counter CntCsnk,
    Else
        CntCsnk = CntCsnk -DS
        No ACK to be Sent
    If CntCsnk <=0
        ChannelNo=ChannelNo+1
        CntCsnk =HiX_S;
}
```

APPENDIX B – CLOCK-BASED CHANNEL-SWITCHING PSEUDO CODE

*Source Operation Pseudo Code*

```
% example values for parameters:
   Nchan = 16
   MaxX = 9
   TSFlarge = 2 msec
   TSFsmall = 1 msec
   Xexit = 2
   Delta = 1
   IS = 1/3
   DS = 1

% the clock value wraps modulo(Nclock)
Nclock = 2*Nchan

% SRC INITIALIZATION %%%%%%%%%%%%%%%%%%%%%%%%%%%%%%%%%%%%%%%% state.ChanSeqNo = 0     % channel sequence number (progresses as 0,1,2,...)
state.Mode = DataMode
state.TSFsize = TSFlarge
state.X = MaxX          % the Hop-In-X count

% SRC MAIN LOOP %%%%%%%%%%%%%%%%%%%%%%%%%%%%%%%%%%%%%%%%%%%%% for each TSF
    if (state.mode==DataMode)
        SRC_DataMode()
    else
        SRC_HopMode()
    end
end

% SRC DATA MODE %%%%%%%%%%%%%%%%%%%%%%%%%%%%%%%%%%%%%%%%%%%%%

SRC_DataMode() [
```

```
        state.Gclock_next = mod(state.Gclock+TSFratio,Nclock)
        if Nsnk ACKs received, allACK = 1, else allACK = 0, end
        if allACK
            state.X = state.X + IS
            if (state.X > MaxX)
                state.X = MaxX
            end
            out_packet.SSflag = 0      % send a data packet next
            out_packet.ESflag = 0
            out_packet.X = state.X
        else
            state.X = state.X - DS
            if (state.X < 0)
                state.X = 0
            end
            if (state.X == 0)
                % enter hop mode next
                state.ChanSeqNo_next = floor(state.Gclock_next/2)
                state.TSFsize_next = TSFsmall
                if mod(state.Gclock_next,2)    % if Gclock will be odd
                    state.Mode_next = HopModeC
                    % do not send a packet
                else                           % if Gclock will be even
                    state.Mode_next = HopModeA
                    out_packet.SSflag = 1  % send an SS packet next
                    out_packet.ESflag = 0
                end
            else
                % stay in DataMode
                out_packet.SSflag = 0  % send a data packet
                out_packet.ESflag = 0
                out_packet.X = state.X
            end
        end
    end
] end

% SRC HOP MODE %%%%%%%%%%%%%%%%%%%%%%%%%%%%%%%%%%%%%%%%%%%%%%%%%%%%%%%%
```

```
SRC_HopMode() [
    state.Gclock_next = mod(state.Gclock+1,Nclock)
    switch state.Mode
        case HopModeA
            if Nsnk ACKs received, allACK = 1, else allACK = 0, end
            if allACK
                state.Mode_next = HopModeB
                out_packet.SSflag = 0   % send an ES packet
                out_packet.ESflag = 1
            else
                % at least one ACK missed so wait
                state.Mode_next = HopModeC
                % do not send a packet
            end
        case HopModeB
            % exit next
            state.Mode_next = DataMode
            state.TSFsize_next = TSFlarge
            state.X = Xexit
            out_packet.SSflag = 0   % send a data packet
            out_packet.ESflag = 0
            out_packet.X = state.X
        case HopModeC
            % next TSF: change channel and send out an SS
            state.ChanSeqNo_next = floor(state.Gclock_next/2)
            state.Mode_next = HopModeA
            out_packet.SSflag = 1   % send an SS packet
            out_packet.ESflag = 0
    end
] end
```

Sink Operation Pseudo Code

```
% SNK INITIALIZATION %%%%%%%%%%%%%%%%%%%%%%%%%%%%%%%%%%%%%%%%% state.ChanSeqNo = 0        % channel sequence number (progresses as
0,1,2,...)
```

```
state.Mode = DataMode
state.TSFsize = TSFlarge
state.Y = MaxX              % SNK's local Hop-In-X count (FT)

% SNK MAIN LOOP %%%%%%%%%%%%%%%%%%%%%%%%%%%%%%%%%%%%%%%%%%%%%%%%% for each TSF
    if (state.mode==DataMode)
        SNK_DataMode()
    else
        SNK_HopMode()
    end
end

% SNK DATA MODE %%%%%%%%%%%%%%%%%%%%%%%%%%%%%%%%%%%%%%%%%%%%%%%%%

SNK_DataMode() [
    state.Gclock_next = mod(state.Gclock+TSFratio,Nclock)
    if in_packet.error
        state.Y = state.Y - DS
        if state.Y < 0
            state.Y = 0
        end
    else
        if (in_packet.X > Delta)
            state.Y = in_packet.X - Delta
        else
            state.Y = 0
        end
    end
    if (state.Y == 0)
        % enter hopping mode next
        state.ChanSeqNo_next = floor(state.Gclock_next/2)
        state.TSFsize_next = TSFsmall
        if mod(state.Gclock_next,2)     % Gclock will be odd
            state.Mode_next = HopModeC
        else
            state.Mode_next = HopModeA  % Gclock will be even
```

```
            end
        end
        if in_packet.error
            % do not send an ACK packet (silent NACK)
        else
            % send an ACK packet
        end
] end

% SNK HOP MODE %%%%%%%%%%%%%%%%%%%%%%%%%%%%%%%%%%%%%%%%%%%%%%%%%%%%%

SNK_HopMode() [
    state.Gclock_next = mod(state.Gclock+1,Nclock)
    % an ACK packet is not sent unless explicitly stated
    switch state.Mode
        case HopModeA
            % expecting an SS
            if ~in_packet.error & in_packet.SSflag
                % SS received, so send an ACK and wait for an ES
                state.Mode_next = HopModeB
                % send an ACK packet
            else
                % SS not received, so wait
                state.Mode_next = HopModeC
            end
        case HopModeB
            % expecting an ES (send no ACK packet regardless)
            if ~in_packet.error & in_packet.ESflag
                % ES received
                % large TSF boundary reached so exit next
                state.Mode_next = DataMode
                state.TSFsize_next = TSFlarge
                state.Y = Xexit
            else
                % an ES was not received so expect an SS next
                state.Mode_next = HopModeA
                state.ChanSeqNo_next = floor(state.Gclock_next/2)
            end
```

```
        case HopModeC
            % waiting for next frame that might have an SS
            state.Mode_next = HopModeA
            state.ChanSeqNo_next = floor(state.Gclock_next/2)
    end
] end
```

What is claimed is:

1. A non-transitory computer accessible memory medium storing program instructions to switch a first device from a first communications channel to a second communications channel in a predetermined ordered set of communications channels, wherein the program instructions are executable to perform:

storing information regarding the predetermined ordered set of communication channels, wherein the predetermined ordered set of communication channels includes the first communications channel and the second communications channel;

adjusting a value of a first counter of the first device to track data packet transmission errors between the first device and a second device using the first communications channel, wherein a value of a second counter that tracks the data packet transmission errors between the first and second device is independently maintained at the second device;

providing the value of the first counter from the first device to the second device to synchronize the first counter and the second counter; and switching the first device to the second communications channel based on the information regarding the predetermined ordered set of communication channels, wherein said switching is performed only after the value of the first counter reaches a channel-switching threshold, wherein the second device switches to the second communications channel only after the second counter of the second device reaches the channel-switching threshold.

2. The non-transitory computer accessible memory medium according to claim 1, wherein the first device is a data source, the second device is one of at least one data sink, and adjusting the value of the first counter comprises:

increasing the value of the first counter by an increment step when the source receives expected acknowledgement signals from every sink;

decreasing the value of the first counter by a decrement step when the source receives fewer than all of the expected acknowledgement signals; and reducing the value of the first counter to a predetermined maximum value when the value of the first counter exceeds the predetermined maximum value;

wherein each sink transmits a respective one of the expected acknowledgement signals when that sink receives a corresponding data packet from the source.

3. The non-transitory computer accessible memory medium according to claim 2, wherein the source expects to receive the acknowledgement signals from every sink within a time super frame in which the source transmitted the corresponding data packet to the sinks.

4. The non-transitory computer accessible memory medium according to claim 1, wherein the information regarding the predetermined ordered set of communications channels comprises an index, wherein each index position is uniquely mapped to a corresponding one of the communications channels, and wherein the first communications channel is mapped to a first index position and the second communications channel is mapped to a second index position following the first index position.

5. The non-transitory computer accessible memory medium according to claim 1, wherein the first and second devices have respective, synchronized clocks which recursively measure time by a predetermined limited number of clock counts, wherein each clock count is mapped to a respective one of the communications channels in the predetermined ordered set of communications channels, and wherein the second communications channel is mapped to a present count clock when the first device is switched to the second communications channel.

6. A first device for communicating with a second device in a wireless communications system, the first device having control logic for causing the first device to:

store information regarding a predetermined ordered set of communication channels, wherein the predetermined ordered set of communication channels includes a first communications channel and a second communications channel;

communicate data packets with the second device in the first communications channel according to the predetermined ordered set of communications channels;

track a first quality measurement of the first communications channel using a first counter to track data packet transmission errors between the first device and the second device, wherein the second device is configured to independently track the first quality measurement using a second counter;

provide the value of the first counter to the second device to synchronize the first counter and the second counter; and switch the first device from the first communications channel to the second communications channel in the predetermined ordered set of communications channels after the value of the first counter reaches a channel-switching threshold, wherein said switching is based on the information regarding the predetermined ordered set of communication channels;

wherein the second device switches to the second communications channel after the value of the second counter reaches the channel-switching threshold.

7. The first device according to claim 6, wherein the first device is a data source, the second device is one of at least one data sink, wherein communicating data packets comprises:

transmitting data packets to the sinks, wherein, in respect of each data packet transmitted, each sink which receives the data packet transmits an acknowledgement signal to the source within a time super frame in which the data packet was transmitted, and wherein tracking the first quality measurement comprises, in respect of each data packet transmitted to the sinks: increasing the first counter when the source receives acknowledgement signals from all of the sinks within the time super frame; and decreasing the first counter when the source fails to receive at least one of the acknowledgement signals within the time super frame.

8. The first device according to claim 6, wherein the information regarding the predetermined ordered set of communications channels comprises an index, wherein each index position is uniquely mapped to a corresponding one of the communications channels, and wherein the first communications channel is mapped to a first index position and the second communications channel is mapped to a second index position following the first index position.

9. The first device according to claim 6, wherein the first and second devices have respective, synchronized clocks which recursively measure time by a predetermined limited number of clock counts, wherein each clock count is mapped to a respective one of the communications channels in the predetermined ordered set of communications channels, and wherein the second communications channel is mapped to a present count clock when the first device is switched to the second communications channel.

10. A channel-switching method in a wireless communications system including a plurality of devices including a source and at least one sink, the devices communicating in a first communications channel in a predetermined ordered set of communications channels, the method comprising:

storing information regarding the predetermined ordered set of communication channels, wherein the predetermined ordered set of communication channels includes the first communications channel and a second communications channel;

adjusting a value of a source counter associated with the source to track data packet transmission errors between the source and the or all of the sinks;

for the or each sink, adjusting a value of a sink counter associated with that sink to track the value of the source counter;

switching the source to a second communications channel in the predetermined ordered set of communications channels when the value of the source counter reaches a channel-switching threshold, wherein said switching is based on the information regarding the predetermined ordered set of communication channels; and for the or each sink, switching that sink to the second communications channel when the value of the sink counter associated with that sink reaches the channel-switching threshold.

11. The channel-switching method according to claim 10, wherein adjusting the value of the source counter comprises:

increasing the value of the source counter by an increment step when the source receives expected acknowledgement signals from the or every sink;

decreasing the value of the source counter by a decrement step when the source receives fewer than all of the expected acknowledgement signals; and reducing the value of the source counter to a predetermined maximum value when the value of the source counter exceeds the predetermined maximum value wherein the or every sink transmits a respective one of the expected acknowledgement signals when that sink receives a corresponding expected data packet from the source;

and wherein, for the or each sink, adjusting the value of the sink counter associated with that sink comprises:

setting the value of the sink counter based on the value of the source counter when the sink device receives the expected data packet from the source, wherein the expected data packet contains the value of the source counter; and decreasing the value of the sink counter by the decrement step when the sink fails to receive the expected data packet from the source.

12. The channel-switching method according to claim 11, wherein the source expects to receive the acknowledgement signals from the or every sink within a time super frame in which the source transmitted the corresponding expected data packet to the or every sink, and wherein the or every sink expects to receive the expected data packet from the source within that time super frame.

13. The channel-switching method according to claim 12, wherein switching the source to the second communications channel comprises setting the source counter to a post-switching value greater than the channel-switching threshold and less than or equal to the predetermined maximum value, and wherein, for the or each sink, switching the sink to the second communications channel comprise setting the sink counter associated with that sink to the post-switching value.

14. The channel-switching method according to claim 13, wherein the information regarding the predetermined ordered set of communications channels comprises an index, wherein each of the communications channels is uniquely mapped to a corresponding index position, wherein the first communications channel is mapped to a first index position, and wherein, for each device, switching the device to the second communications channel comprises determining a second index position following the first index position, the second index position being mapped to the second communications channel.

15. The channel-switching method according to claim 14, wherein switching the source or the or any sink to the second communications channel further comprises switching that device to at least one other communications channel in the predetermined ordered set of communications channels between the first and second communications channels before switching that device to the second communications channel.

16. The channel-switching method according to claim 12, further comprising, for each device, maintaining a clock associated with that device, wherein all of the clocks are synchronized, and wherein every clock recursively measures time by a predetermined limited number of clock counts, wherein each clock count is mapped to a respective one of the communications channels in the predetermined ordered set of communications channels, and wherein, for each device, switching the device to the second communications channel comprises determining a present clock count of the clock associated with that device, wherein the present clock count is mapped to the second communications channel when that device is switched to the second communications channel.

17. The channel-switching method according to claim 16, wherein switching the source to the second communications channel comprises:

transmitting a start sync packet from the source to the or every sink;

receiving at the source a respective acknowledge sync packet transmitted from the or each and every sink; and transmitting an end sync packet from the source to the or every sink;

and wherein, for the or each sink, switching that sink to the second communications channel comprises:

receiving at that sync the start sync packet transmitted from the source;

transmitting the respective acknowledge packet from that sink to the source; and receiving at that sink the end sync packet transmitted from the source.

18. The channel-switching method according to claim 17, wherein switching the source or the or any sink to the second communications channel further comprises switching that device to at least one other communications channel in the predetermined ordered set of communications channels between the first and second communications channels before switching that device to the second communications channel.

19. A non-transitory computer accessible memory medium storing program instructions to switch a first device from a first communications channel to a second communications channel in a predetermined ordered set of communications channels, wherein the program instructions are executable to perform:

storing information regarding the predetermined ordered set of communication channels, wherein the predetermined ordered set of communication channels includes the first communications channel and the second communications channel;

adjusting a value of a first counter of the first device to track data packet transmission errors between the first device and a second device using the first communication channel, wherein a value of a second counter that tracks the data packet transmission errors between the first and second device is independently maintained at the second device, wherein said adjusting comprises:
    setting the value of the first counter according to the value of the second counter when the first device receives an expected data packet from the second device, wherein the expected data packet contains the value of the second counter; and
    decreasing the value of the first counter by a decrement step when the first device fails to receive the expected data packet from the second device;
switching the first device to the second communications channel based on the information regarding the predetermined ordered set of communication channels, wherein said switching is performed only after the value of the first counter reaches a channel-switching threshold,
wherein the second device switches to the second communications channel only after the second counter of the second device reaches the channel-switching threshold.

20. The non-transitory computer accessible memory medium according to claim 19, wherein the first device expects to receive the expected data packet from the second device within a time super frame.

21. A first device for communicating with a second device in a wireless communications system, the first device having control logic for causing the first device to:
    store information regarding a predetermined ordered set of communication channels, wherein the predetermined ordered set of communication channels includes a first communications channel and a second communications channel;
    communicate data packets with the second device in the first communications channel in a predetermined ordered set of communications channels;
    track a first quality measurement of the first communications channel using a first counter to track data packet transmission errors between the first device and the second device, wherein the second device is configured to independently track the first quality measurement using a second counter, and wherein said tracking comprises:
        setting the value of the first counter according to the value of the second counter when the first device receives an expected data packet from the second device, wherein the expected data packet contains the value of the second counter; and
        decreasing the value of the first counter by a decrement step when the first device fails to receive the expected data packet from the second device;
    switch the first device from the first communications channel to the second communications channel in the predetermined ordered set of communications channels based on the information regarding the predetermined ordered set of communication channels, wherein said switching is performed after the value of the first counter reaches a channel-switching threshold;
    wherein the second device switches to the second communications channel after the value of the second counter reaches the channel-switching threshold.

22. The first device according to claim 21, wherein the first device expects to receive the expected data packet from the second device within a time super frame.

\* \* \* \* \*